United States Patent
Pinkerton

(10) Patent No.: US 6,323,573 B1
(45) Date of Patent: Nov. 27, 2001

(54) HIGH-EFFICIENCY INDUCTOR-ALTERNATOR

(75) Inventor: Joseph F. Pinkerton, Austin, TX (US)

(73) Assignee: Active Power, Inc., Austin, TX (US)

(*) Notice: Subject to any disclaimer, the term of this patent is extended or adjusted under 35 U.S.C. 154(b) by 0 days.

(21) Appl. No.: 09/533,569

(22) Filed: Mar. 23, 2000

Related U.S. Application Data

(62) Division of application No. 09/076,573, filed on May 11, 1998.

(51) Int. Cl.[7] .................................................. H02K 31/00
(52) U.S. Cl. ........................... 310/178; 310/74; 310/179; 310/261; 322/28; 322/29; 290/40 R
(58) Field of Search ........................... 310/178, 74, 68 D, 310/179, 180, 261; 322/28, 29, 14, 15; 290/40 R, 40 F, 40 C; 363/26, 41, 34, 35, 36, 37, 89

(56) References Cited

U.S. PATENT DOCUMENTS

| | | | |
|---|---|---|---|
| 3,375,383 | 3/1968 | Philbrick | 310/103 |
| 3,428,840 | 2/1969 | Kober | 310/114 |
| 4,041,340 | 8/1977 | Mrcun | 310/263 |
| 4,077,678 | 3/1978 | Studer et al. | 308/10 |
| 4,159,434 | 6/1979 | Kalsi | 310/168 |
| 4,186,320 | 1/1980 | Hillman | 310/93 |
| 4,207,487 | 6/1980 | Beyersdorf | 310/268 |
| 4,231,029 | 10/1980 | Johnston | 340/658 |
| 4,334,160 | 6/1982 | McCarty | 310/57 |
| 4,387,335 | 6/1983 | Fisher et al. | 322/32 |
| 4,401,938 | 8/1983 | Cronin | 322/29 |
| 4,444,444 | 4/1984 | Benedetti et al. | 308/10 |
| 4,538,086 | 8/1985 | Marsh et al. | 310/258 |
| 4,677,365 * | 6/1987 | Yang | 322/90 |
| 4,843,296 * | 6/1989 | Tanaka | 318/800 |
| 4,994,684 * | 2/1991 | Lauw et al. | 290/52 |
| 4,996,457 | 2/1991 | Hawsey et al. | 310/268 |
| 5,317,999 | 6/1994 | Kern et al. | 123/182.1 |
| 5,376,877 | 12/1994 | Kern et al. | 322/32 |
| 5,489,811 | 2/1996 | Kern et al. | 310/216 |
| 5,497,735 | 3/1996 | Kern et al. | 123/90.6 |
| 5,545,928 | 8/1996 | Kotani | 290/40 C |
| 5,577,317 | 11/1996 | Bender | 29/753 |
| 5,637,987 | 6/1997 | Fattic et al. | 322/40 |
| 5,656,922 | 8/1997 | La Velle et al. | 322/46 |
| 5,723,933 | 3/1998 | Gründl et al. | 310/266 |
| 5,731,645 | 3/1998 | Clifton et al. | 310/74 |
| 5,736,798 | 4/1998 | O'Brien et al. | 310/51 |
| 5,744,896 | 4/1998 | Kessinger, Jr. et al. | 310/268 |
| 5,753,988 | 5/1998 | Cipriani | 310/103 |
| 5,831,366 | 11/1998 | Kern et al. | 310/216 |
| 5,886,504 * | 3/1999 | Scott et al. | 322/15 |
| 6,021,052 * | 2/2000 | Unger et al. | 363/26 |

FOREIGN PATENT DOCUMENTS 2 100 936   1/1983   (GB) ............................. H02K/19/20

* cited by examiner

Primary Examiner—Elvin Enad
Assistant Examiner—Thanh Lam
(74) Attorney, Agent, or Firm—Fish & Neave; Robert W. Morris

(57) ABSTRACT

An inductor-alternator provides highly efficient conversion between mechanical and electrical energy. The inductor-alternator produces increased output by providing armature coils in a single air gap formed between two halves of a toothed rotor. In preferred embodiments, field coils of a magnetic circuit are energized with DC drive current that creates homopolar flux within the rotating rotor. Airgap armature coils are mounted with the field coils to form a stationary assembly that is placed within the single air gap in the rotor so that the changing flux density (due to the rotating teeth) induces an output voltage in the armature coils. The rotor and stationary assembly are mounted in a housing by bolts that may also be used as terminals for the armature coils to reduce assembly complexity and production cost. The combined assembly provides high energy and power density because tip speed of the rotor is maximized and the use of air gaps is minimized.

15 Claims, 21 Drawing Sheets

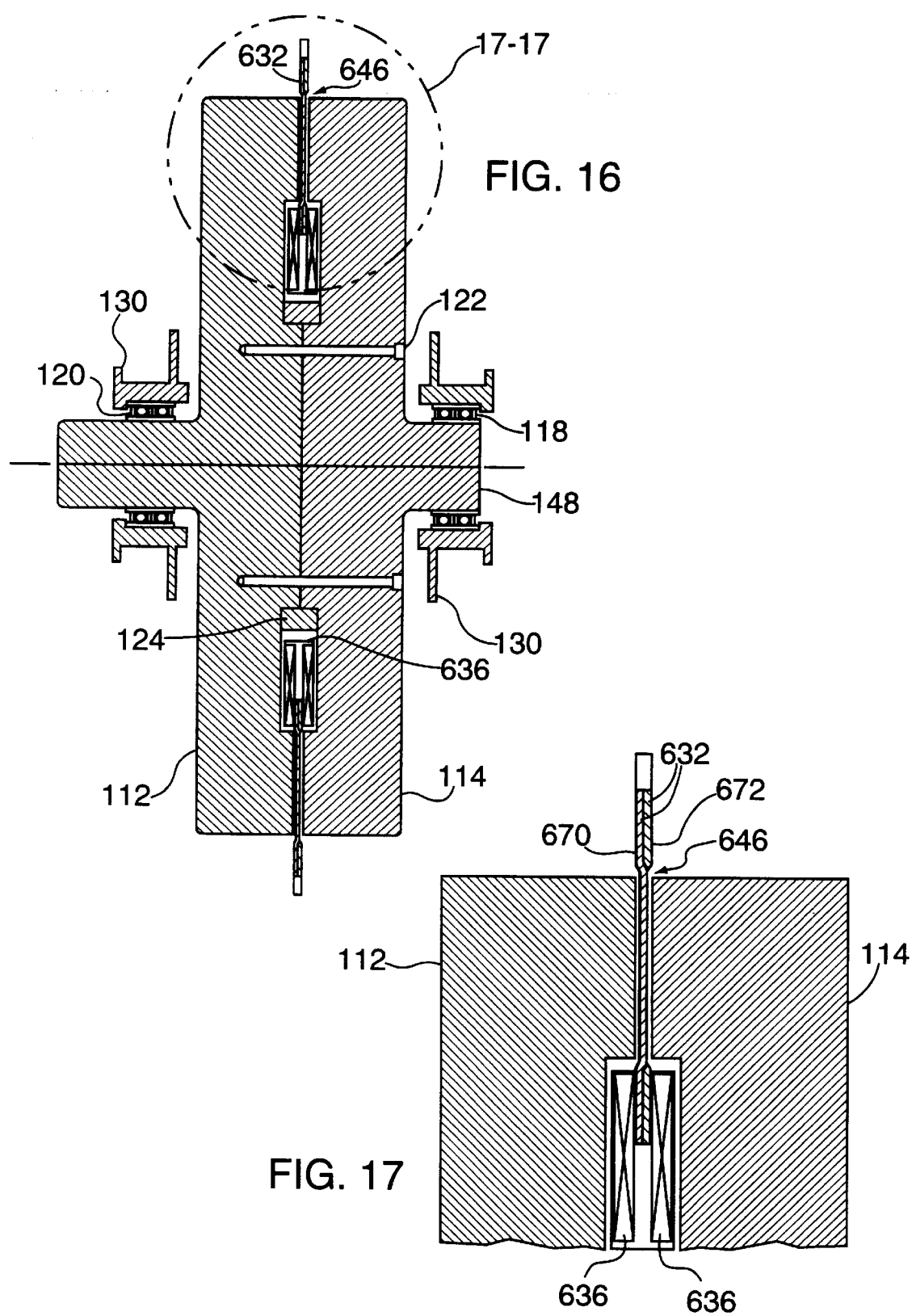

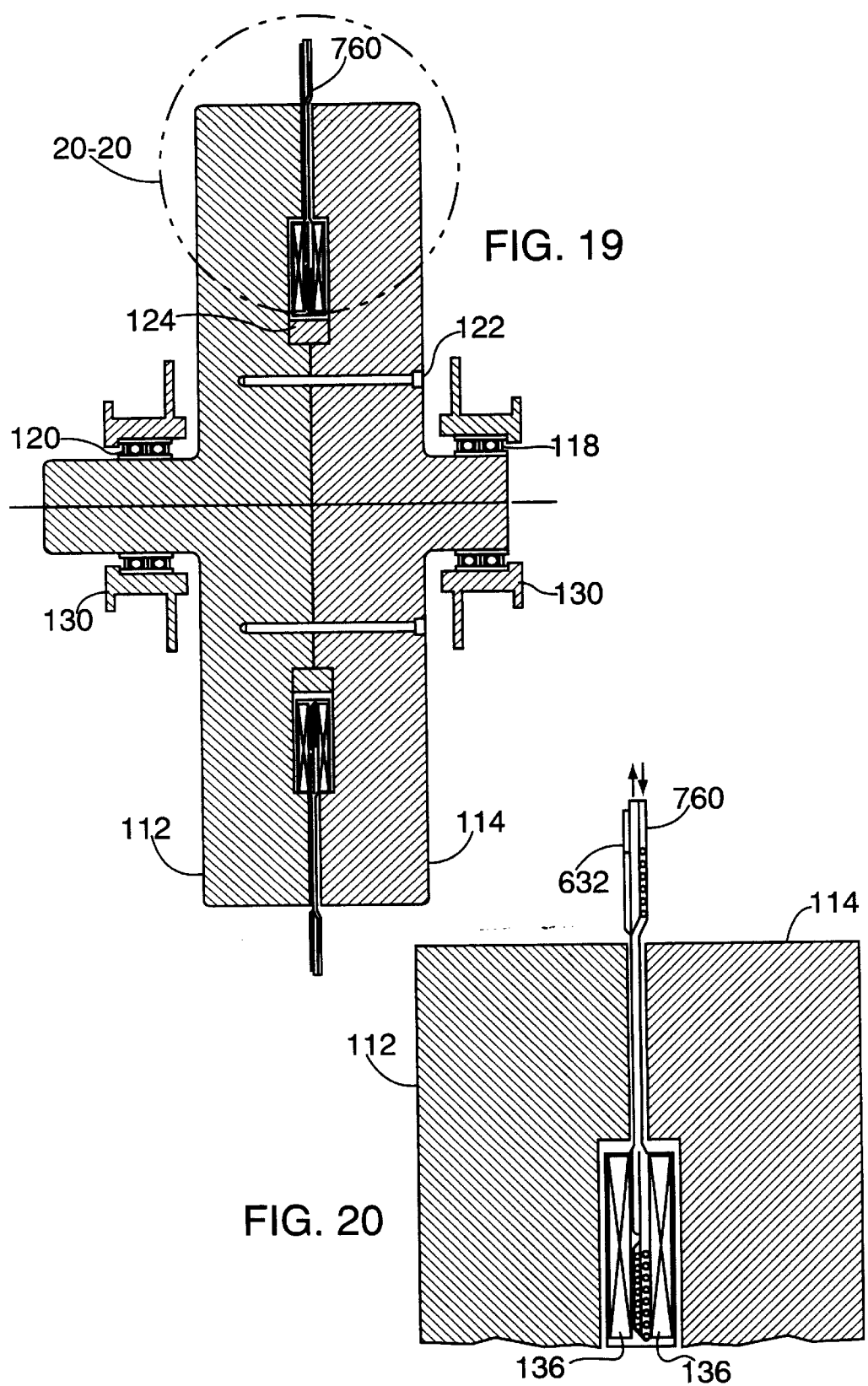

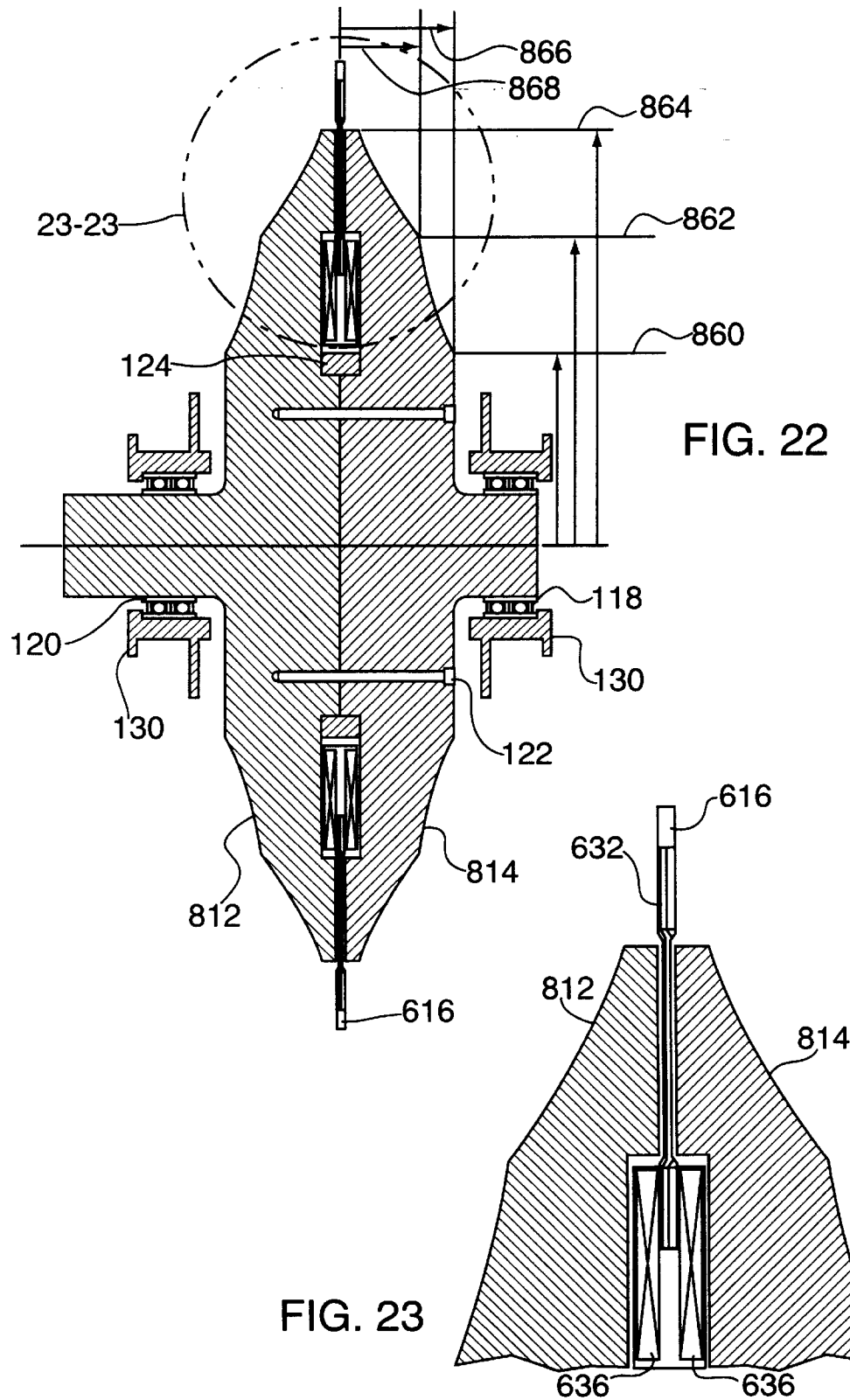

HIGH-EFFICIENCY INDUCTOR-ALTERNATOR

CROSS REFERENCE TO RELATED APPLICATION

This is a divisional of U.S. patent application Ser. No. 09/076,573, filed May 1, 1998, which is incorporated by reference in its entirety.

BACKGROUND OF THE INVENTION

This invention relates to mechanical energy conversion devices that include inductor-alternators and methods for providing increased output power, and more particularly toward high-efficiency inductor-alternator energy conversion devices including brushless motor-generators having low inductance armature windings. The inductor-alternators of the present invention include armature windings that are located in a single magnetic air gap of an unusually high reluctance field circuit in place of traditional armature windings that are enclosed in the high permeability parts of a lower reluctance field circuit.

Mechanical energy storage devices have been proposed and/or used for a variety of different purposes. For example, flywheel energy storage devices may be used as a backup source of energy in situations requiring a continuous supply of reserve power in the event of a primary power source failure (i.e., failure by a utility company supply). In such situations, it is often required that a secondary power source supply a nominal amount of power for a certain time period so that various pieces of equipment utilizing primary power may be shut down in a relatively normal fashion, rather than the instantaneous shut down that would occur from a loss of primary power without a backup supply. While flywheel energy storage devices provide several advantages over the use of a bank of chemical batteries (another traditional, short-term, secondary power source), both devices are often combined with an emergency generator that provides long-term secondary power.

One application of such a device is in a paper mill where substantially liquid paper pulp is sprayed onto a rotating wire mesh and then carried through a long series of rollers through ovens to remove the moisture from the pulp. It may take several minutes for the liquid pulp to pass through all of the ovens before the pulp has dried and reached the end of the line where it is rolled up onto high speed spools. An instantaneous loss of power under such circumstances would be catastrophic. Therefore, paper mills must have some form of short-term secondary power to keep all of the equipment running while the pulp supply is shut off and the remainder of the pulp already on the production line is processed.

Chemical batteries suffer from various deficiencies including bulkiness, lack of reliability, limited lifespan, high maintenance costs and relatively low safety. For example, chemical batteries require relatively constant and complex recharging, depending on the type of batteries involved to insure that the batteries continue to operate efficiently and maintain their full storage capacity. Additionally, chemical batteries raise various safety considerations due to the general nature of the large quantities of caustic chemicals involved. Typical large battery installations often require special venting and air-conditioning systems for the dedicated battery storage rooms.

Conventional flywheel energy storage devices have their own set of deficiencies. For example, achieving a high level of energy conversion efficiency is often difficult due to energy losses. Moreover, the energy losses often generate significant heat. In order to minimize the energy losses due to air drag friction, some flywheel system are designed to operate in a vacuum (e.g., see Benedetti et al. U.S. Pat. No. 4,444,444). The vacuum condition demands, however, that heat generation in the rotating components be minimized because rotor heat in a vacuum can only be dissipated by radiation or conduction through bearing surfaces that are small and have limited heat conducting capacity. Moreover, the vacuum condition typically necessitates the use of brushless motor-generators because brushes tend to exhibit extremely short lifespans when operated in vacuum conditions. Brushless motor-generators, however, typically utilize heat generating components such as rotating rectifier assemblies and rotating coils that add further complications.

Another application for these energy storage devices is power generation. Utility companies, for example, have varying demands for power. These variations may be seasonal, daily or a combination of the two. One system that attempts to address peak demand power is Studer et al. U.S. Pat. No. 4,077,678 (hereinafter, "Studer"). Studer shows a flywheel energy storage device that includes a composite, flywheel rotor (having an inner rim of magnetically soft iron) magnetically suspended around a ring-shaped rotor. Permanent magnets generate magnetic flux in the air gaps between the rotor and the stator. During low demand periods, the flywheel is operated as a motor under utility power. As demand increases, the device may be operated as a generator. Studer, however, is inefficient because it requires significant input energy, either in the form of high field coil current or the amount of permanent magnet material used, for normal operation. This inefficiency is substantially due to the use of three air gaps (i.e., axial air gap 36 and radial air gaps 46) in the magnetic circuit. Moreover, Studer has a relatively low energy and power density because: (1) much of the magnetic circuit mass of that device does not rotate; (2) a central rotor core limits the tip speed of the active air-gap (and thus the amount of voltage generated per amp-turn of field coil current); and (3) a large empty space in the air gap does not contribute to power generation.

To provide increased energy density, a solid steel rotor may be employed, such as that shown by Kalsi U.S. Pat. No. 4,159,434 (hereinafter, "Kalsi"). Kalsi's solid steel rotor includes a shaft for rotation that enables the device to be operated at higher speeds than rotors that must be mounted to a shaft (e.g., because the stress concentrations at the shaft bore limit rotational speed). Kalsi also attempts to provide improvements in efficiency by utilizing axial air gaps (see Kalsi FIG. 2, air gaps 31) that reduce the number of air gaps from three to two. Unlike the air gaps of Studer (where the radial air gaps generate no voltage), both air gaps of Kalsi are used to generate voltage. Kalsi, however, suffers from some of the deficiencies previously described. For example, Kalsi has a relatively low energy density because a large portion of the magnetic circuit—the laminated pair of rings—does not rotate. These stationary rings also suffer from high AC field core losses that result in a significant generation of heat. Moreover, Kalsi provides armature windings embedded within iron slots cut into the stator core that increase armature inductance resulting in reduced power density.

Another device characterized by high energy storage is described in Kober U.S. Pat. No. 3,428,840 (hereinafter, "Kober"). Kober describes a pair of iron rotors mounted on a rotating shaft. This configuration is better than Kalsi and Studer in energy density because the entire magnetic circuit mass rotates (only approximately half of the magnetic circuit rotates in Kalsi and Studer). Moreover, like Kalsi, Kober employs two functional axial air gaps in a single magnetic circuit instead of the three air gaps described by Studer. However, the energy density of Kober is somewhat limited by the mounting of the rotors on a shaft and the resultant stress concentrations due to the bore therein that limit the tip speed of the active air gap (resulting in a relatively low quantity of voltage generated per amp-turn of field coil current). Further, Kober utilizes copper field coils mounted to the rotors that limit the rotational speed, and therefore the stored kinetic energy and armature voltage per amp-turn of field coil current, of the device. Moreover, Kober is limited to non-vacuum applications because it uses electrical brushes to power the rotating field coils, which results in high aerodynamic losses.

In view of the foregoing, it is an object of this invention to provide an improved energy conversion device that efficiently provides high output power, including a compact design resulting in a high power density.

It is also an object of the present invention to provide an improved energy conversion device capable of achieving high rotational speeds to store mechanical energy.

It is an additional object of the present invention to provide methods and apparatus for reducing the effects of air gap energy losses on high speed energy storage devices.

It is a still further object of the present invention to provide improved energy conversion devices that may be produced at low costs when compared to currently known technologies.

SUMMARY OF THE INVENTION

These and other objects of the invention are accomplished in accordance with the principles of the invention by providing various energy conversion devices. The preferred embodiments include a high-efficiency inductor-alternator having its armature coils located in a single magnetic air gap so that a "line" of flux only crosses a single air gap as it completes a magnetic circuit. The high-efficiency inductor-alternators of the present invention have many applications. For example, they may be used as high-efficiency motors, generators, integrated motor/generator/flywheels, and energy storage devices. The inductor-alternator also includes at least one stationary annular field coil that, in conjunction with a rotating toothed-rotor, produces flux having varying flux density (due to the gaps between the teeth on the rotor).

The airgap coils provide reduced inductance (because the coils are radially thin) that permits faster current rise times and thus, higher power at the high frequencies that are typical of flywheel devices. The airgap coils are designed so that they fill most of the air gap, thereby maximizing the power generated per amp-turn of field coil current. Energy conversion is improved, at least in part, because the devices of the present invention employ a single air gap and because the configurations allow the field coils to have a relatively large cross-section and small diameter.

A further advantage of the present invention is related to the fact that all of the magnetic steel of the devices rotates. Even more importantly, the rotors of the present invention are not encumbered with extraneous components and thus, are not limited in rotational speed. This enables the inductor-alternators of the present invention to provide increased energy density over known devices (the rotational speed—and therefore energy density—is only limited by the material properties of the steel used to form the rotors). Moreover, the lack of iron in the armature dramatically reduces machine core losses and thus increases inductor-alternator efficiency.

An additional advantage of the present invention arises from the relative lack of complexity of the devices. The rotor is formed from two halves of one material (versus a composite structure) that are mounted about a non-magnetic armature assembly (which may be preassembled as a single unit). Those three main components are in a housing that simply is bolted together. The bolts may also be used as armature terminals to further reduce costs and assembly complexity. A further advantage of this configuration is that the field and armature coils are conductively cooled by the housing, which acts as a heat sink. This enables the present invention to be operated in a vacuum for increased efficiency. The high efficiency of the present invention may also be achieved by utilizing the device as an extremely efficient motor-generator, or as a high-efficiency flywheel energy storage system. For example, efficiency is increased in all applications because all of the rotor teeth may be magnetized by a single, low resistance field coil (which, while shown in the figures as having two halves for optimal conductive cooling, still operates as a single field coil).

Further features of the invention, its nature and various advantages will be more apparent from the accompanying drawings and the following detailed description of the preferred embodiments.

BRIEF DESCRIPTION OF THE DRAWINGS

FIG. 16 is a cross-sectional view of the bent armature coil high-efficiency inductor-alternator of FIG. 14;

FIG. 17 is a close-up, cross-sectional view of the dual armature high-efficiency inductor-alternator of FIG. 16 taken along line 17—17;

FIG. 19 is a cross-sectional view of the liquid cooled high-efficiency inductor-alternator of FIG. 18;

FIG. 20 is a close-up, cross-sectional view of the liquid cooled high-efficiency inductor-alternator of FIG. 19 taken along line 20—20;

FIG. 22 is a cross-sectional view of the high-efficiency inductor-alternator of FIG. 21;

FIG. 23 is a close-up, cross-sectional view of the high-efficiency inductor-alternator of FIG. 22 taken along line 23—23.

DETAILED DESCRIPTION OF THE PREFERRED EMBODIMENTS

Figure 1:
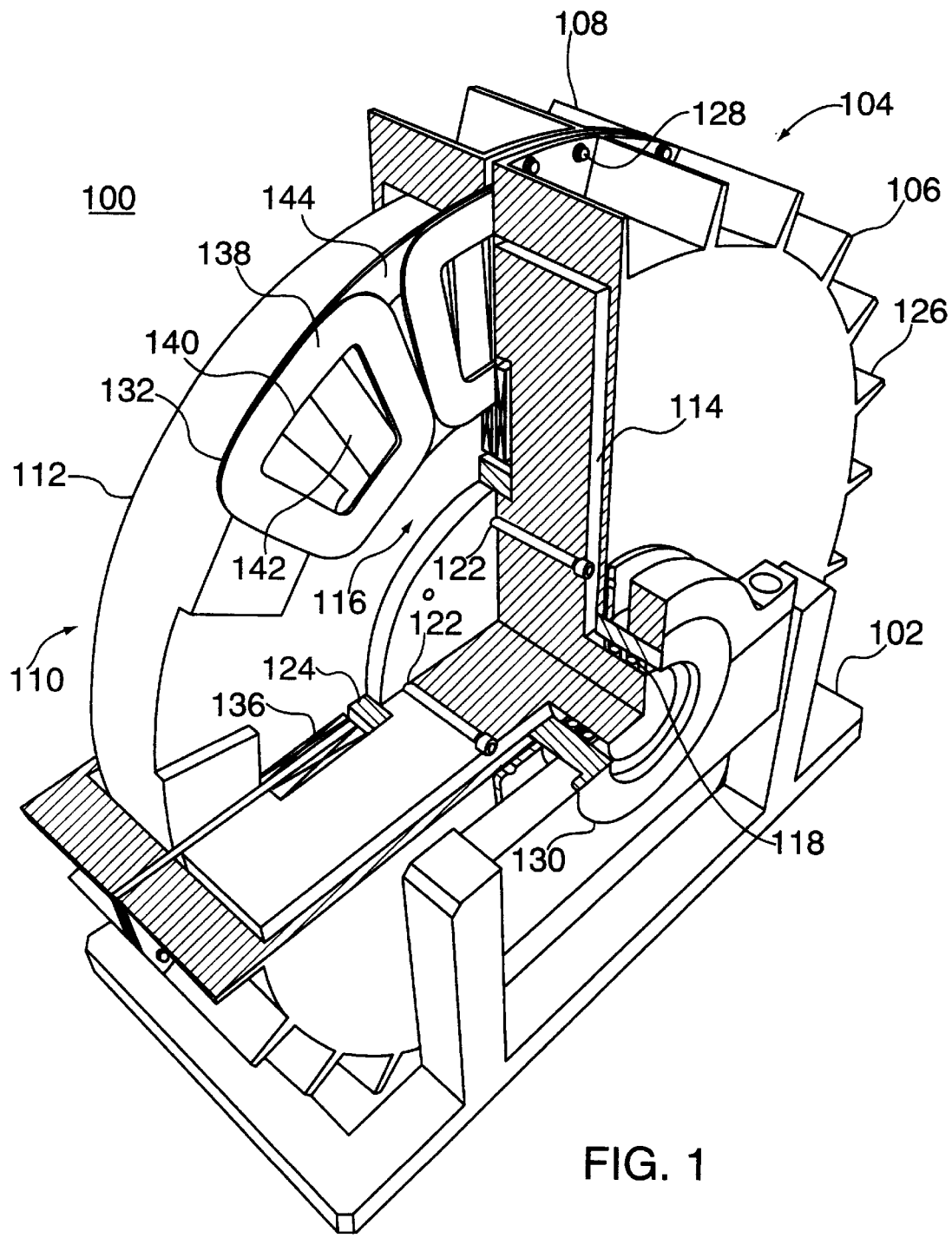
FIG. 1 is a three-dimensional, partialcutaway, perspective view of a high-efficiency inductor-alternator constructed in accordance with the principles of the present invention.
Figure 2:
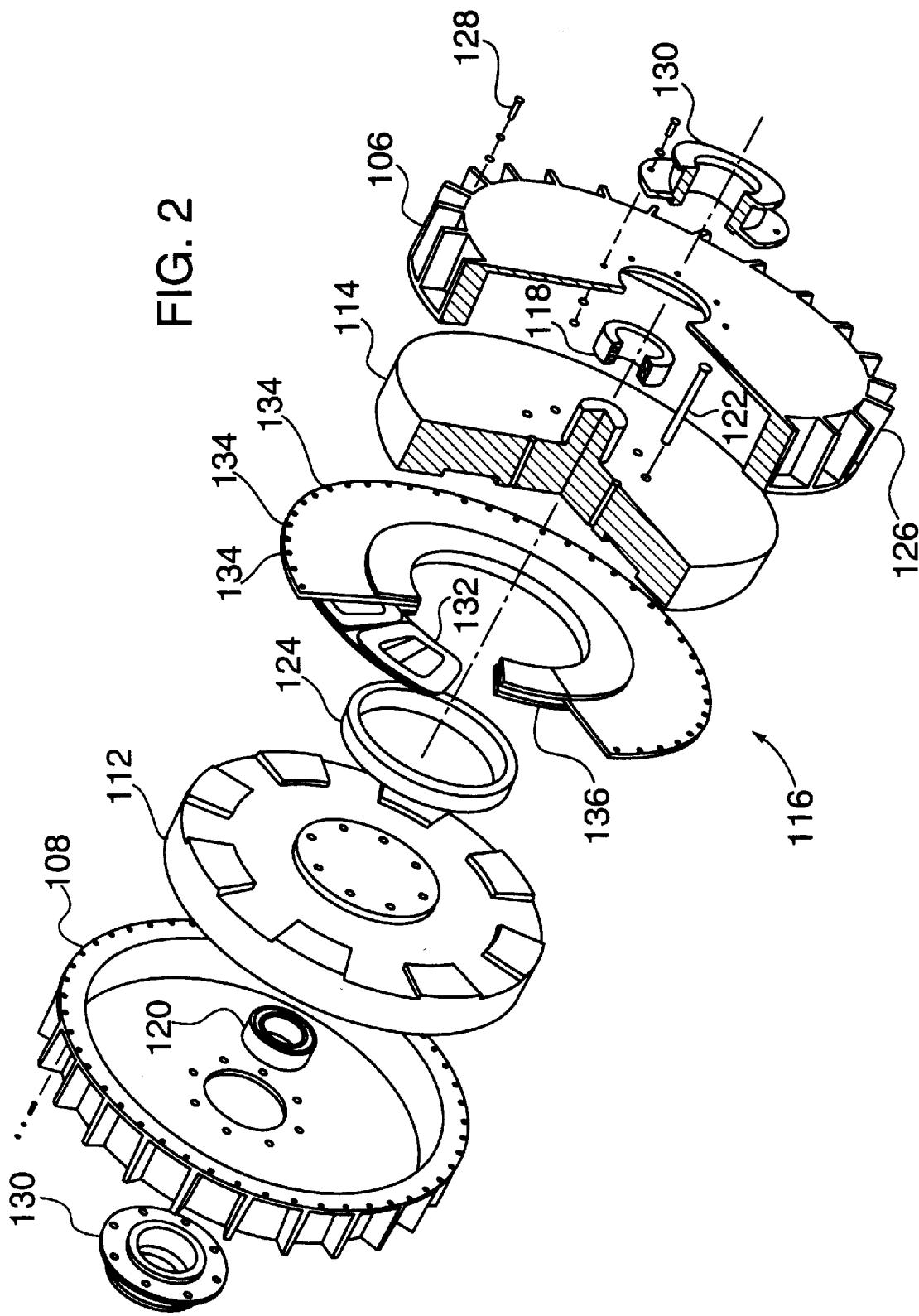
FIG. 2 is a three-dimensional exploded view of the high-efficiency inductor-alternator of FIG. 1.

FIG. 1 shows a three-dimensional perspective view of high-efficiency inductor-alternator 100 constructed in accordance with the principles of the present invention. Inductor-alternator 100, which may be mounted on frame 102, includes housing 104 (formed by shells 106 and 108), toothed rotor 110 (formed by rotor halves 112 and 114), stationary assembly 116 and bearings 118 and 120 (bearing 120 is shown in FIG. 2). Rotor halves 112 and 114 are fixed together by bolts 122, which provide axial support, and retainer ring 124, which provides radial support. Shells 106 and 108, which are preferably cast aluminum and include cooling fins 126, are held together by bolts 128. Bearings 118 and 120 are each mounted in a bearing cartridge 130 that is preferably removable to provide easy access for maintenance. Bearing cartridges 130 are mounted to frame 102 to provide stability during operation.

The construction of inductor-alternator 100, including the composition of stationary assembly 116, may be more readily apparent by referring to FIG. 2, the exploded view of the device of FIG. 1. Stationary assembly 116 includes multiple armature coils 132 that may be preformed and potted within an epoxy structure that provides terminals 134 for connection to each of coils 132. As is apparent from FIGS. 1 and 2, coils 132 are preferably interleaved in layers such that the legs of the two coils below a given coil appear in the "window" of the given coil (e.g., given coil 138 includes a "window" 140 through which leg 142 of lower coil 144 is visible).

As shown in FIGS. 1 and 2, assembly 116 includes a total of twenty-four armature coils 132, formed in two layers of twelve coils each (therefore, at least forty-eight bolts 128 would be used in this example—two for each coil 132). This clearly shows that armature coils 132 of the present invention are not separated by iron slots (as is traditionally done), and more wire can fit within the single air gap. The ability to provide an increased volume of wire in the air gap is an additional factor that makes the devices of the present invention more compact, resulting in a higher power density than previously known energy storage devices.

Although twenty-four armature coils 132 are shown in FIGS. 1 and 2, persons skilled in the art will appreciate that various other configurations may be utilized without departing from the scope of the present invention. If the desired device is a three-phase device (in which case every third armature coil 132 would be coupled together), however, the total number of armature coils should be divisible by three in order to maintain proper phase alignment. Assembly 116 also includes field coils 136 that produce a homopolar magnetic flux within rotor 110 when energized (e.g., by a substantially DC current as explained in more detail below).

The placement of the field coils within stationary assembly 116 provides the advantage that the unsupported weight of the field coils is not added to the rotating portion of the device (which would limit the tip speed of the device, and thus the generated power). Moreover, in accordance with the present invention, all of the teeth on rotor 112 may be energized by a single field coil (the field coils of the preferred embodiments, even though they are shown as being divided in half within assembly 116 for improved thermal conduction, are still single field coils that are controlled by one input signal). Further, while the figures show that the teeth of rotor 110 are formed by having protrusions on both rotor halves 112 and 114, persons skilled in the art will appreciate that the teeth also may be formed by having teeth on a single rotor half (e.g., rotor half 112), with the other rotor half (in this case, rotor half 114) being essentially a completely smooth disk. Under such conditions, the rotor teeth on rotor half 112 may be, for example, be twice as long as the rotor teeth shown on rotor half 112 of FIG. 2. It should be noted that the arc length of the rotor teeth should be substantially equal to the arc length of the spaces between each pair of rotor teeth (to minimize bucking voltages within the armature coils, etc.).

Airgap armature coils 132 may be formed from a unitary piece of solid electrically conductive, low permeability material (e.g., copper), but are preferably made up of turns of wire, each of which may consist of a plurality of electrical conductors that are electrically insulated from each other and are electrically connected together in parallel. One such wire, known as litz wire, is constructed of individual film-insulated wires which are bunched or braided together in a uniform pattern of twists and length of lay (thus, a coil formed of litz wire has at least one set of conductors that are parallel to each other coupled together in series with at least one other set of parallel conductors). This configuration reduces skin effect power losses of solid conductors, or the tendency of high frequency current to be concentrated at the conductor surface. Properly constructed litz wires have individual strands each positioned in a uniform pattern moving from the center to the outside and back within a given length of the wire. In addition to the reduction of skin effect losses, litz wire and other multi-strand bundles of small gauge wire produce dramatically lower eddy current losses than a single strand of larger wire.

Rotor 110 is mounted between shells 106 and 108 such that a single air gap is formed between rotor halves 112 and 114. Assembly 116 is preferably mounted to housing 104 by bolts 128 so that assembly 116 is mounted within the air gap between rotor halves 112 and 114. Bolts 128 may be electrically insulated from housing 104 and configured so that each of terminals 134 is connected to a bolt 128 to provide easy access to each of armature coils 132. This configuration provides an additional advantage of cooling for armature coils 132 and field coils 136 because assembly 116 is in thermal contact with housing 104. Moreover, the thermal conductive cooling of armature coils 132 and field coils 136 (via heat sink housing 104) enable rotor 112 to be rotated in a vacuum, thereby providing an additional increase in efficiency. Additionally, as shown in FIG. 3 (described below), armature coils 132 are designed such that they substantially fill air gap 146, thereby maximizing the voltage generated per amp-turn of field coil.

Figure 3:
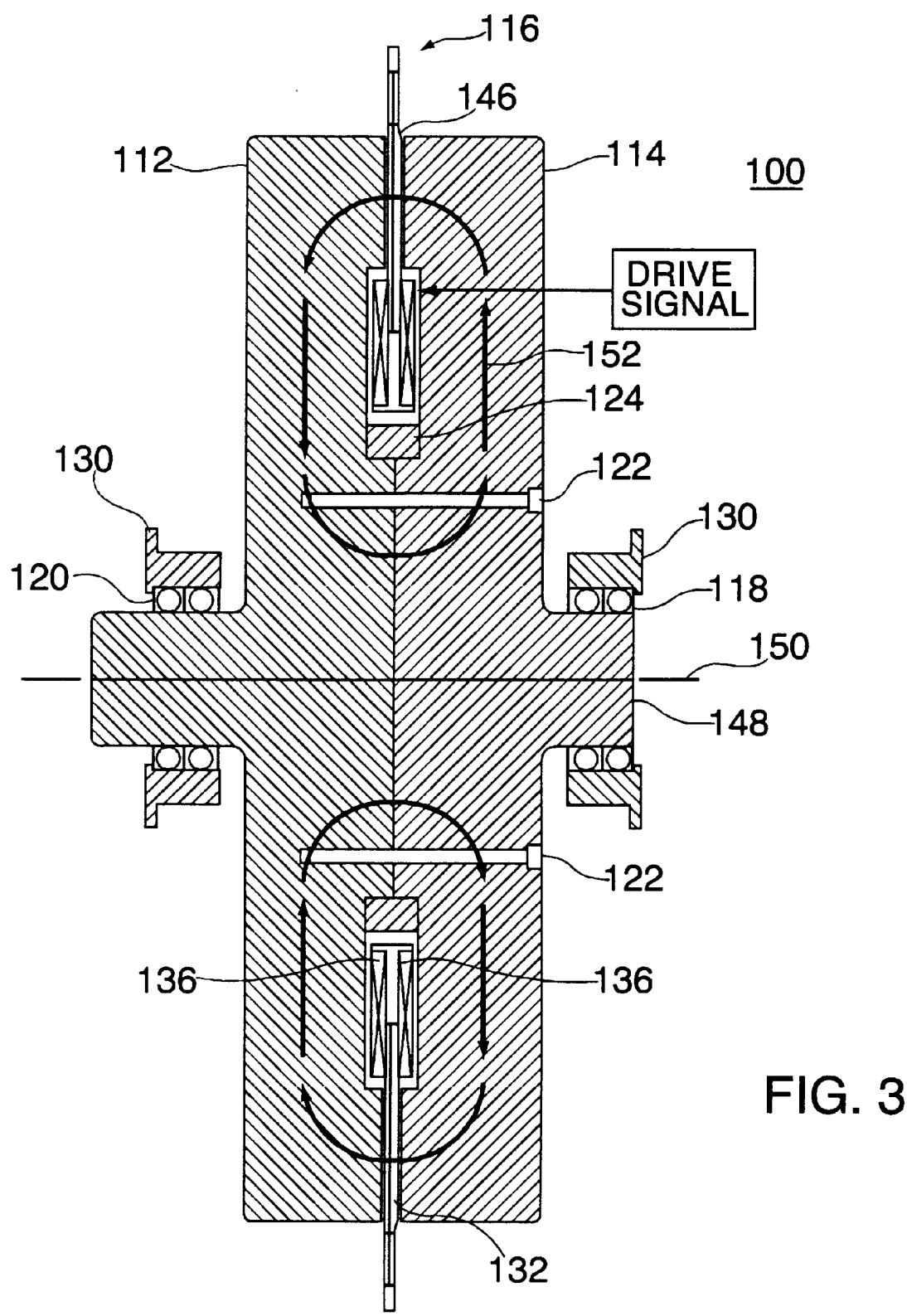
FIG. 3 is a cross-sectional view of the high-efficiency inductor-alternator of FIG. 1.

FIG. 3 shows a cross-sectional view of inductor-alternator 100 in which single magnetic air gap 146 may be easily viewed. As previously described, once assembled, rotor 110 behaves as a unitary rotor formed from a single piece of material. Moreover, as shown in FIG. 3, rotor 110 includes an integral shaft 148 so that rotor 110 may be rotated about axis 150. The use of an integral shaft for rotation of rotor 112 provides the additional advantage of not limiting the tip speed of the device (e.g., Kober shows a rotor mounted to a shaft which limits the speed of rotation due to the stress concentrations near the shaft-bore interface).

When field coils 136 are energized by, for example, a substantially DC current, a homopolar magnetic flux is produced that flows in the direction indicated by flux lines 152 (if the polarity of current were reversed, the direction of the flux would also, of course, be reversed). As can be observed by following flux lines 152, the flux only crosses a single air gap 146 before the magnetic circuit is complete, which maximizes the active flux per amp-turn of field coil current. The flux density is proportional to the current in field coils 136. The utilization of single magnetic air gap 146 minimizes the power dissipated by field coils 136 for a given flux density in air gap 146. When armature coils 132 are exposed to the magnetic flux, the time varying flux (due to the rotation of rotor 110) generates an AC voltage in armature coils 132 that may be provided to a load (not shown) via terminals 134 and bolts 128.

The output voltage of armature coils 132 is directly proportional to the tip speed of the rotating teeth of rotor 110 and to the flux density of single air gap 146, while the power is proportional to the square of voltage (given a constant circuit impedance). Because armature air gap flux density is directly proportional to the current applied to the field coils 136, the inductor-alternator of the present invention is able to easily maintain a constant output voltage by slowly increasing the current applied to field coils 136 as rotor 110 slows down. This eliminates the need for expensive power electronics often used in conjunction with known energy storage devices.

Inductor-alternator 100 provides increased operational efficiency over conventional devices for several reasons. As described above, inductor-alternator 100 includes single air gap 146 instead of multiple air gaps, which reduces energy losses in field coils 136. In addition, because rotor 110 is a "single" component made of a single material (instead of a composite), a high-inertia rotor is provided that does not require a separate flywheel rotor. Moreover, inductor-alternator 100 has a high energy density because all of the magnetic material rotates and, because of the inner portion of the integral shaft (which provides a path for the flux to travel, as compared to the outer portion of the integral shaft that is mounted in bearings 118 and 120 and transmits almost no flux), thus, the rotational speed of rotor 110 is only limited by the material properties of the iron it is produced from. Armature voltage per unit armature coil length may be maximized because of the increased air gap tip speed. Additionally, energy losses are minimized because there are no AC magnetic fields in the magnetic iron of the device.

The configuration of inductor-alternator 100 provides additional advantages over conventional devices. For example, inductor-alternator 100 is easily assembled and unassembled because the field coils and armature coils are formed as a single, stationary unit that is simply bolted in place. This configuration also provides easy, external access to each terminal of the armature coils via the bolts used to assemble the housing. The stationary assembly also provides a thermal conduction path from the field coils through the armature coils to the housing cooling fins to prevent overheating of the field coils (heat from the armature coils also can be dissipated by these same cooling fins).

The advantages of the present invention may also be obtained by using inductor-alternator 100 as a motor-generator with only minor modifications. Under such circumstances, armature coils 132 are provided with a drive signal while field coils 136 are energized (so that a magnetic flux circuit, such as that shown by flux lines 152, is established). The electrical energy input to armature coils 132 is converted to mechanical energy that causes rotor 112 to rotate at a given speed (which varies with change in electrical energy input into the device). Under these circumstances, inductor-alternator 100 operates as a highly efficient and power dense motor. In generator mode, shaft 148 is rotated by an external source (for example, such as those shown in FIGS. 5–7 and described below) while field coil 136 is energized. The flux circuit established by field coil 136 passes through armature coils 132 in single air gap 146. The time varying flux induces a voltage in armature coils 132, which outputs energy based on the speed at which shaft 148 is driven.

Figure 4:
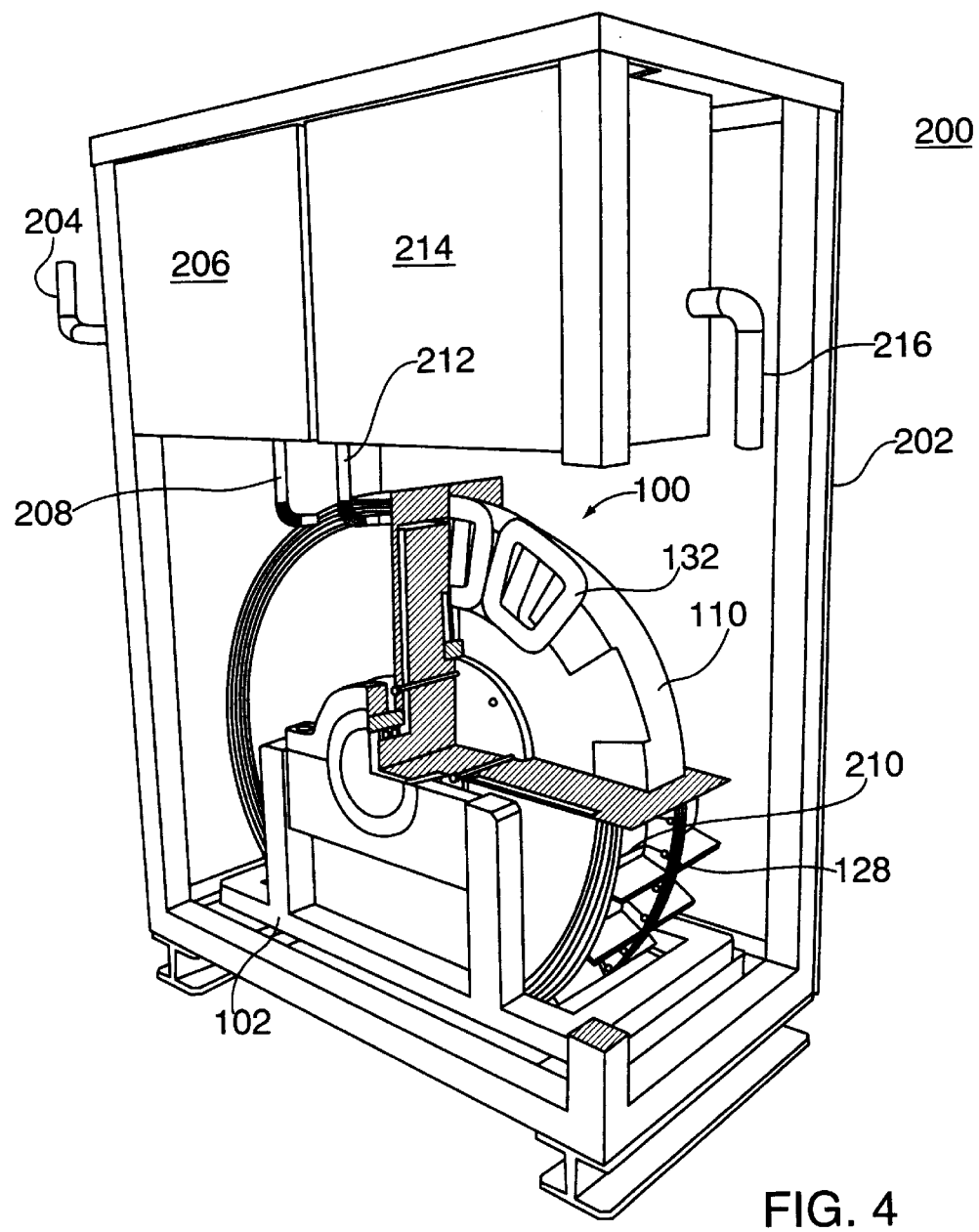
FIG. 4 is a three-dimensional, partial-cutaway, perspective view of a preferred uninterruptible power supply constructed in accordance with the principles of the present invention.

One embodiment of the inductor-alternators of the present invention is shown in FIG. 4 in uninterruptible power supply 200 (UPS 200). UPS 200 includes one instance of inductor-alternator 100 of FIG. 1 mounted within cabinet 202 via frame 102. Utility power is input to UPS 200 via cable 204 and routed to variable speed drive 206 which converts the input power from utility frequency (i.e., 50 or 60 Hz) to a higher frequency. The converted power is fed to device 100 via cable 208 and stored as mechanical energy in rotor 110 (which accelerates and rotates in response to the applied energy).

When utility power fails, the stored mechanical energy in rotor 110 is converted to a high frequency AC output voltage which is output from armature coils 132 via terminals 134 (see FIGS. 1 and 2) and bolts 128. Each of bolts 128 are connected via individual wires 210 to cable 212, which is connected to converter 214. Converter 214 converts the high frequency AC power, which may vary from about 300 to about 2000 Hz, into 50 or 60 Hz power that is routed to a load (not shown) via cable 216. UPS 200 provides secondary power for intermittent losses of utility power without chemical batteries, as are traditionally used. Additionally, UPS 200 provides secondary power in the event of a total loss of utility power for enough time so that either an orderly shutdown of critical equipment may occur, or until a backup standby generator may be brought on-line. Alternatively, UPS 200 can be used as a DC energy storage system, in which case it would be connected to the DC buss of a conventional UPS (not shown).

Figure 5:
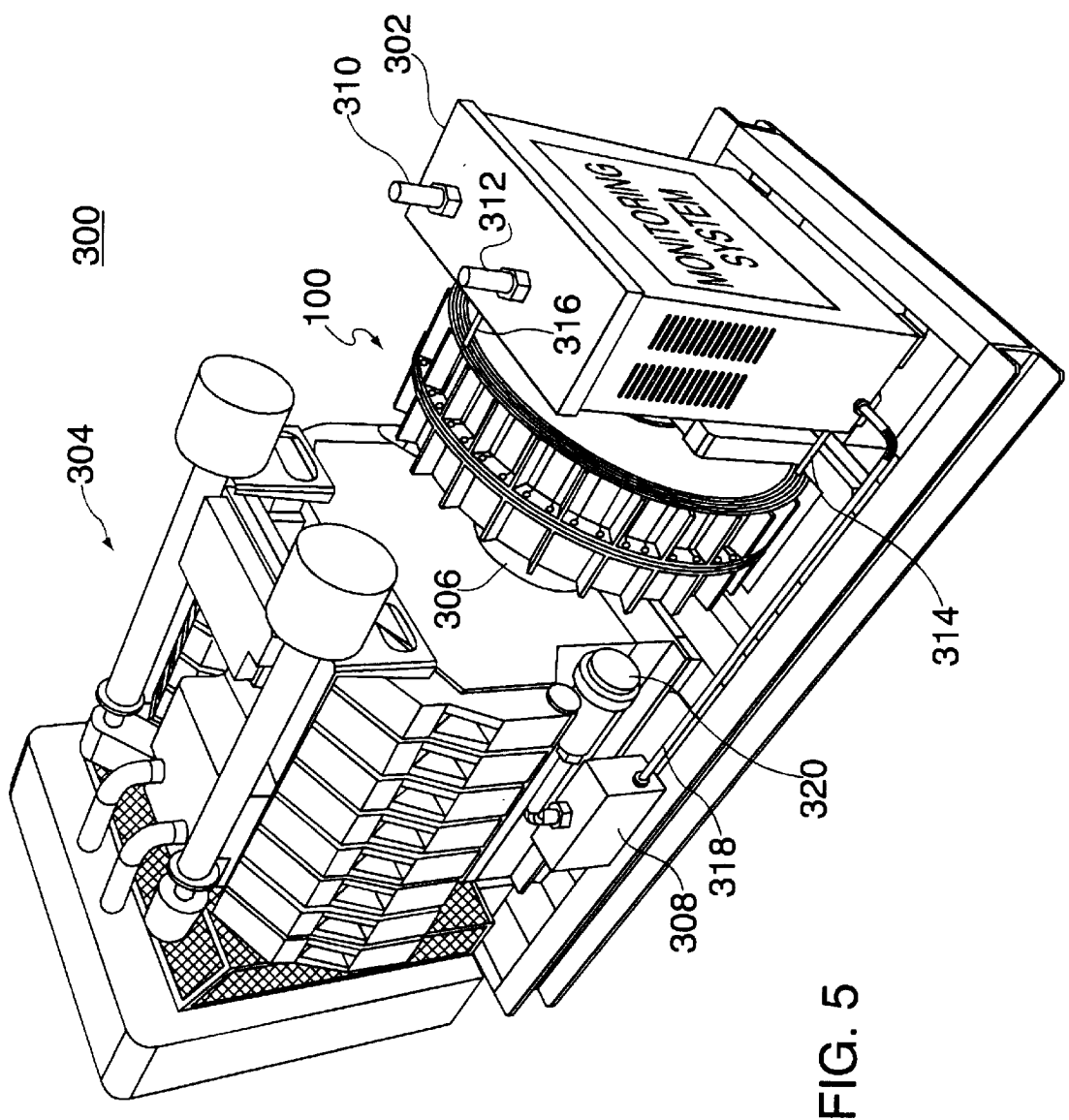
FIG. 5 is a three-dimensional perspective view of a continuous power system constructed in accordance with the principles of the present invention.
Figure 6:
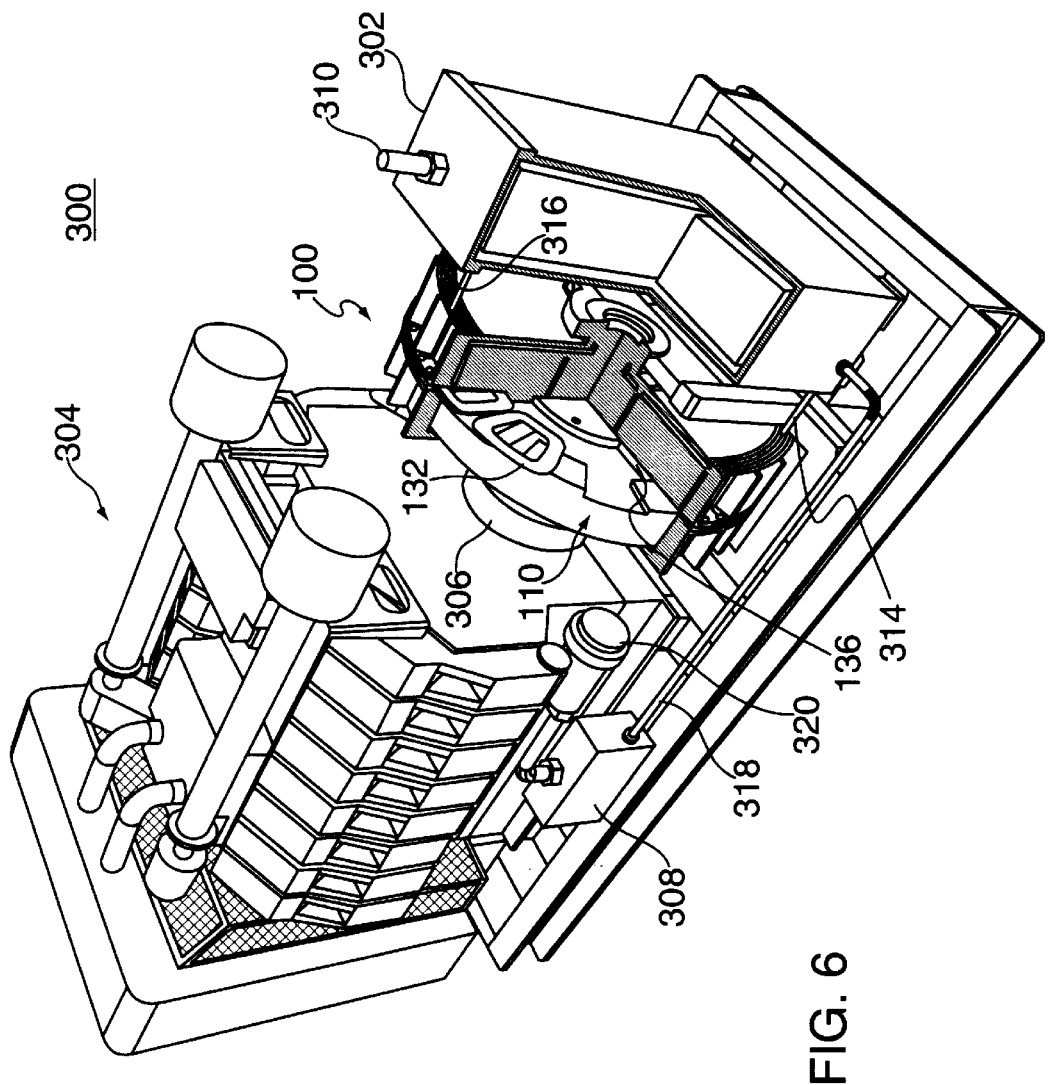
FIG. 6 is a three-dimensional, partial-cutaway, perspective view of the continuous power system of FIG. 5.
Figure 7:
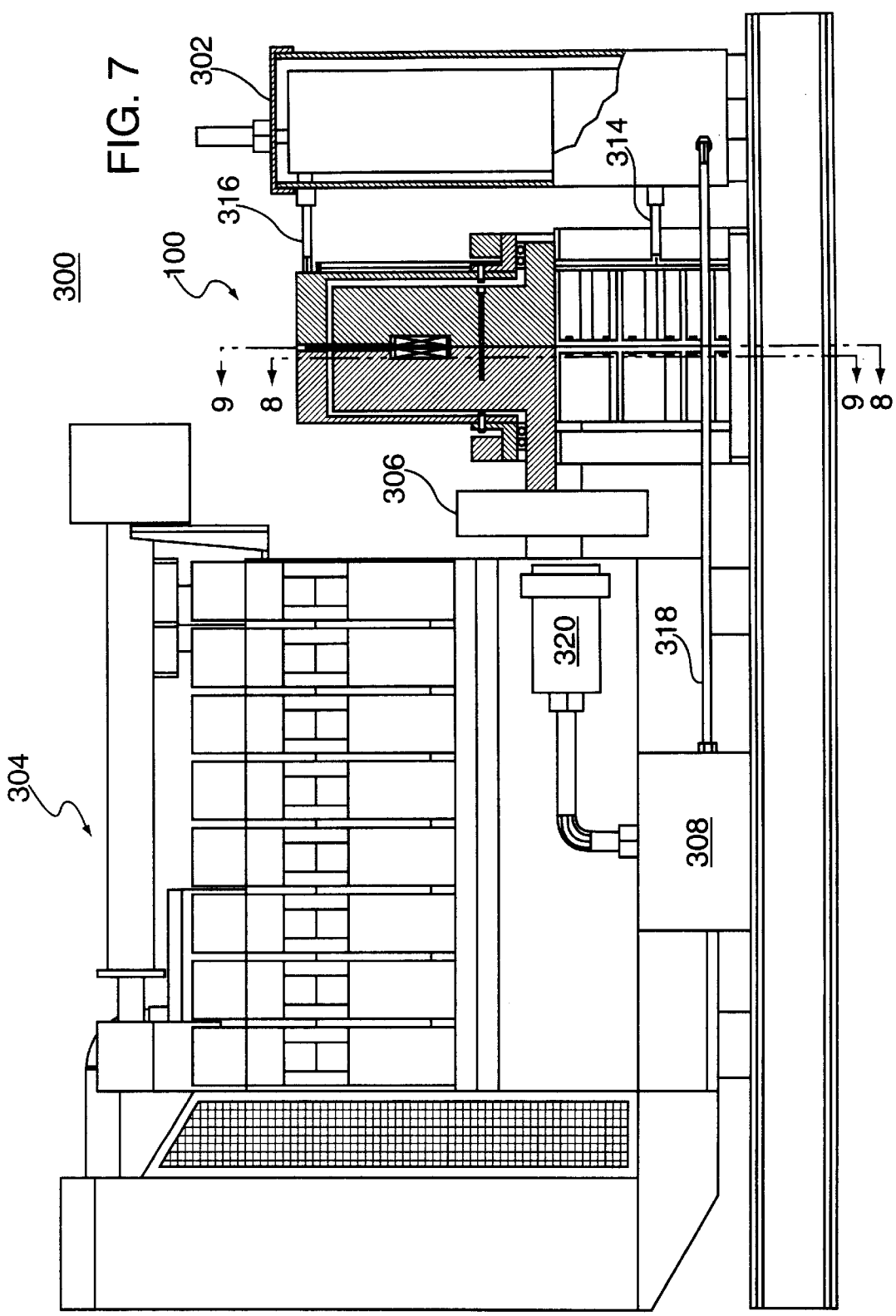
FIG. 7 is a side partial cross-sectional view of the continuous power system of FIG. 5.
Figure 8:
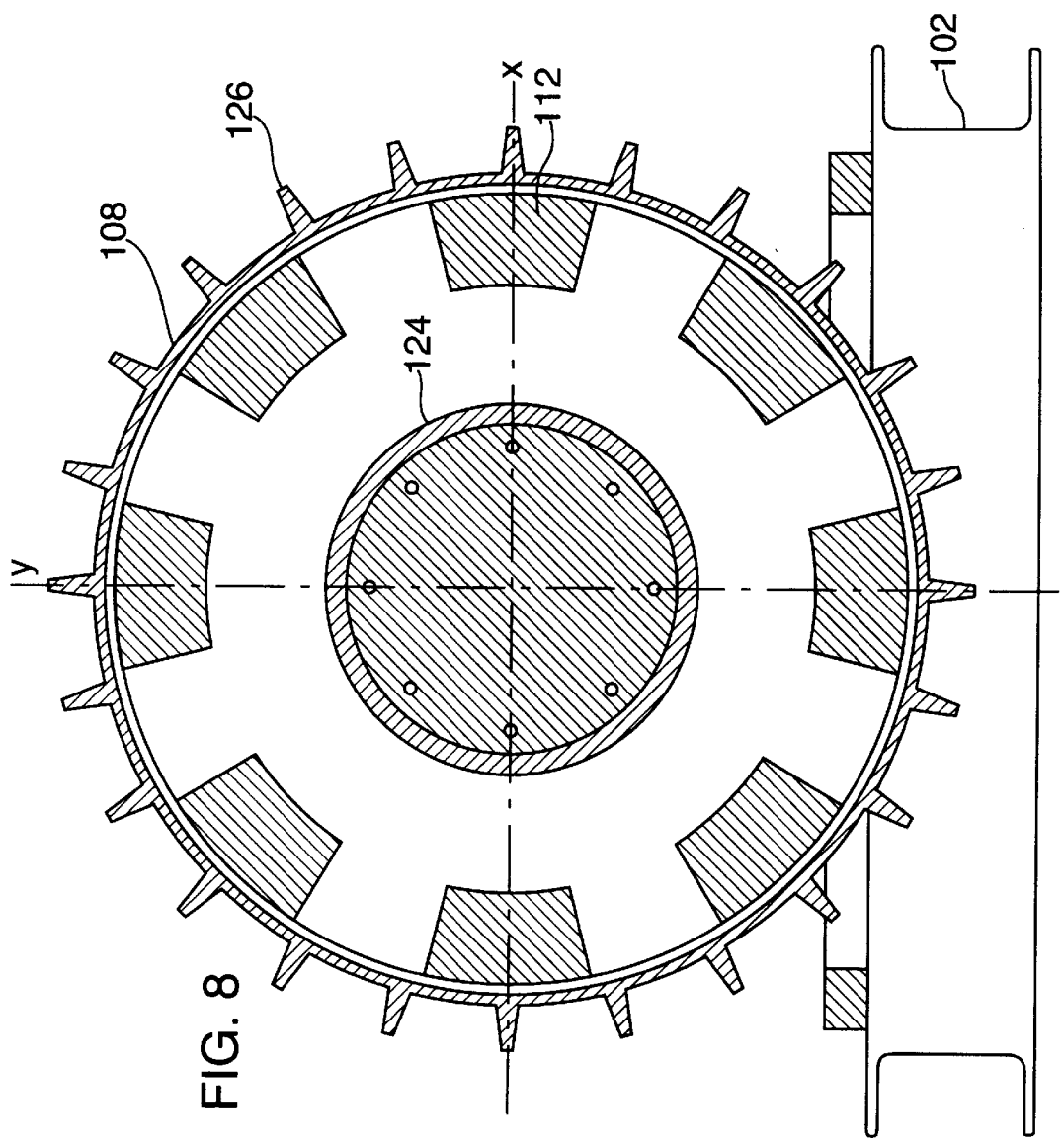
FIG. 8 is a cross-sectional view of the continuous power system of FIG. 5 taken along section line 8—8.
Figure 9:
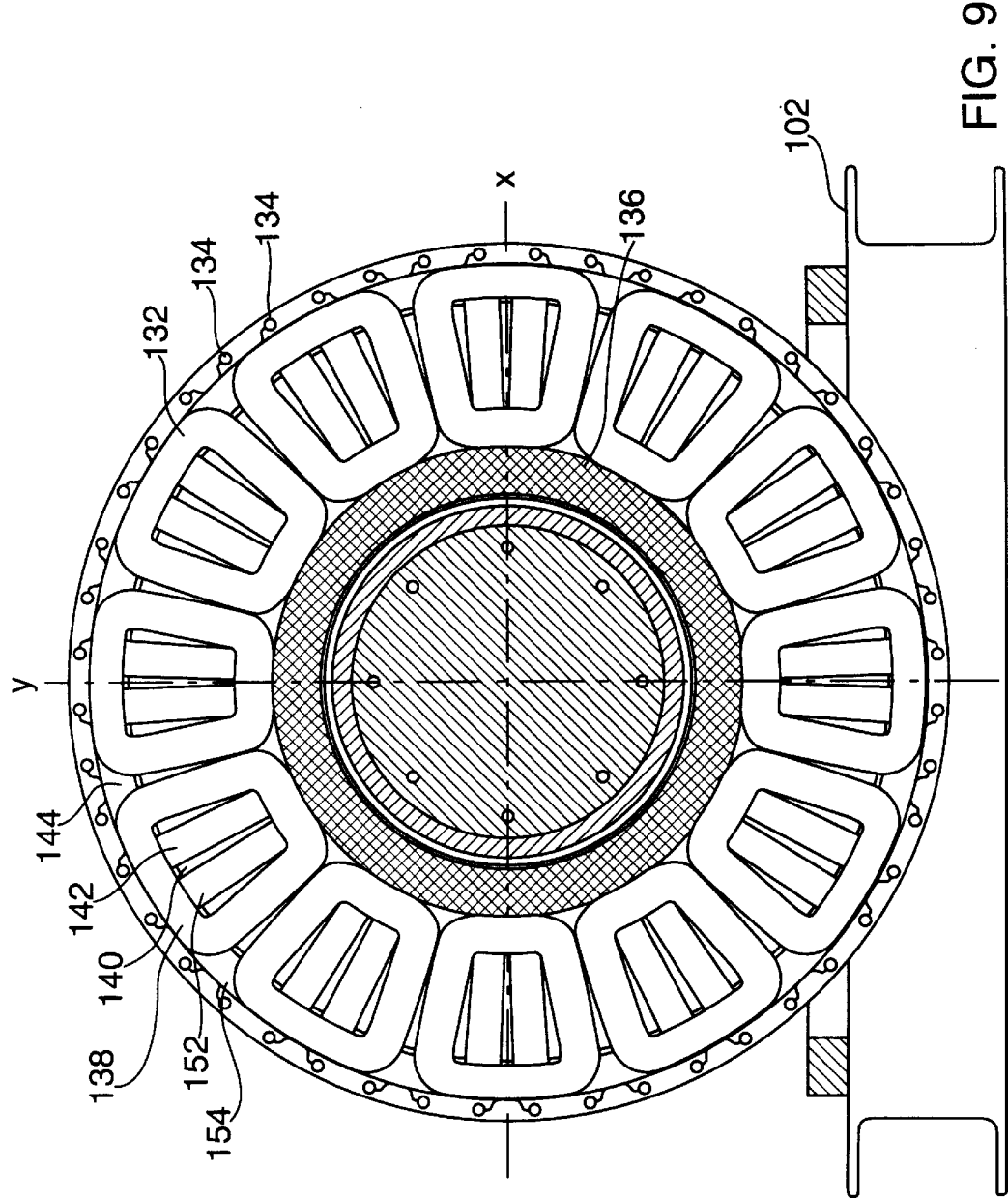
FIG. 9 is a cross-sectional view of the continuous power system of FIG. 5 taken along section line 9—9.

FIGS. 5–9 show another embodiment of the present invention in which inductor-alternator 100 is utilized in continuous power system 300 (CPS 300). FIGS. 5 and 6 show three-dimensional perspective views (FIG. 6 includes a partial cutaway); FIG. 7 shows a side view; and FIGS. 8 and 9 show cross sectional views of inductor-alternator 100 taken at lines 8—8 and 9—9, respectively. CPS 300 includes one instance of device 100, electronics module 302, engine 304, over-running clutch 306 and DC power supply 308. Utility power is input into CPS 300 via cable 310, while power is provided to a critical load (not shown) from CPS 300 via cable 312.

The utility power is converted by electronics module 302 into high frequency AC power and provided to armature coils 132 and field coils 136 of inductor-alternator 100 via cable 314, which causes rotor 110 to rotate at full speed (which is approximately 3600 rpm in this example based on the speed of engine 304, which is commercially available). The maximum surface speed of rotor 110 is approximately 250 meters per second due to the use of 4340 high strength steel (i.e., steel that is readily available, commercially viable and still includes an acceptable safety factor, thus persons skilled in the art will appreciate that specific applications may require the use of other materials that may be operated at even higher speeds). Engine 304, which is normally not running, is mechanically connected to inductor-alternator 100 via over-running clutch 306.

When utility power fails, the mechanical energy stored in rotor 110 is converted to electrical power and fed to electronics module 302 via cable 316. A converter within electronics module 302 (or a separate converter module) converts the high frequency AC output of inductor-alternator 100 into useable 50 or 60 Hz power that is provided to the critical load via cable 312. If utility power does not come back on-line within a few seconds, electrical power is also routed to DC power supply 308 via cable 318, which powers engine starter motor 320.

Once started, engine 304 accelerates to approximately one-half of the maximum rpm of rotor 110 (in this case, approximately 1800 rpm). At the same time, rotor 110 slows down to about the same speed (approximately 1800 rpm) due to the transfer of energy from inductor-alternator 100 to the critical load. Engine 302 then causes clutch 306 to engage shaft 148 of rotor 110 which maintains the rotation of rotor 110 at approximately 1800 rpm. Engine 302 thus provides power to the critical load through electronics module 302 and inductor-alternator 100. When utility power returns, engine 304 is turned off and rotor 110 is accelerated back to maximum speed (i.e., approximately 3600 rpm).

Although CPS 300 has been described with respect to an engine speed of approximately 1800 rpm, persons skilled in the art will appreciate that CPS 300 can advantageously generate constant 50 or 60 Hz power independent of engine speed, unlike conventional synchronous generators (in which output frequency is an integral multiple of engine speed). One advantage of this independence is that the engine speed can be varied to the most efficient rpm for a given load. Moreover, for at least the reasons described above, the high-efficiency of inductor-alternator 100 enables CPS 300 to provide more electrical power to the load per unit of engine fuel than conventional engine-generator systems. When CPS 300 is utilized for power generation, the converter circuit within electronics module 302 is preferably a cycloconverter (i.e., a device that converts AC power at one frequency directly into AC power at another, typically lower, frequency without the need for an intermediate DC buss). Under such circumstances, the cycloconverter preferably switches from high frequency to low frequency when either the voltage or current of the high frequency power is substantially zero.

FIG. 9, which shows a section taken along line 9—9 of FIG. 7, illustrates how each of coils 132 are connected by a pair of terminals 134. FIG. 9 also illustrates the two layers of interleaved armature coils 132. For example, upper layer armature coil 138 is configured on top of lower layer coils 144 and 154. Each of lower layer coils 144 and 154 have one leg 142 and 152, respectively, appearing in window 140 of top layer coil 138. Once all of coils 132 have been laid out, the end wires of each coil 132 have been connected to their respective terminals 134, and the field coils 136 have been placed, the entire assembly may be encased in an epoxy resin to form stationary assembly 116. An additional advantage of this configuration is the ease of armature replacement if an armature failure occurs—the entire assembly is simply replaced rather than the conventional time consuming and complex task of rewiring the armature. As shown in FIG. 9, inductor-alternator 100 can include twenty-four armature coils 132 for three-phase operations (i.e., eight coils per phase). In general, the number of legs that appears in window 140 is equal to n−1, where n equals the number of phases in the device (e.g., when n=3, there are n−1=2 adjacent legs within window 140). Thus, if device 100 were, for example, a four-phase device, there would be three legs visible in the expanded window (not shown).

Figure 10:
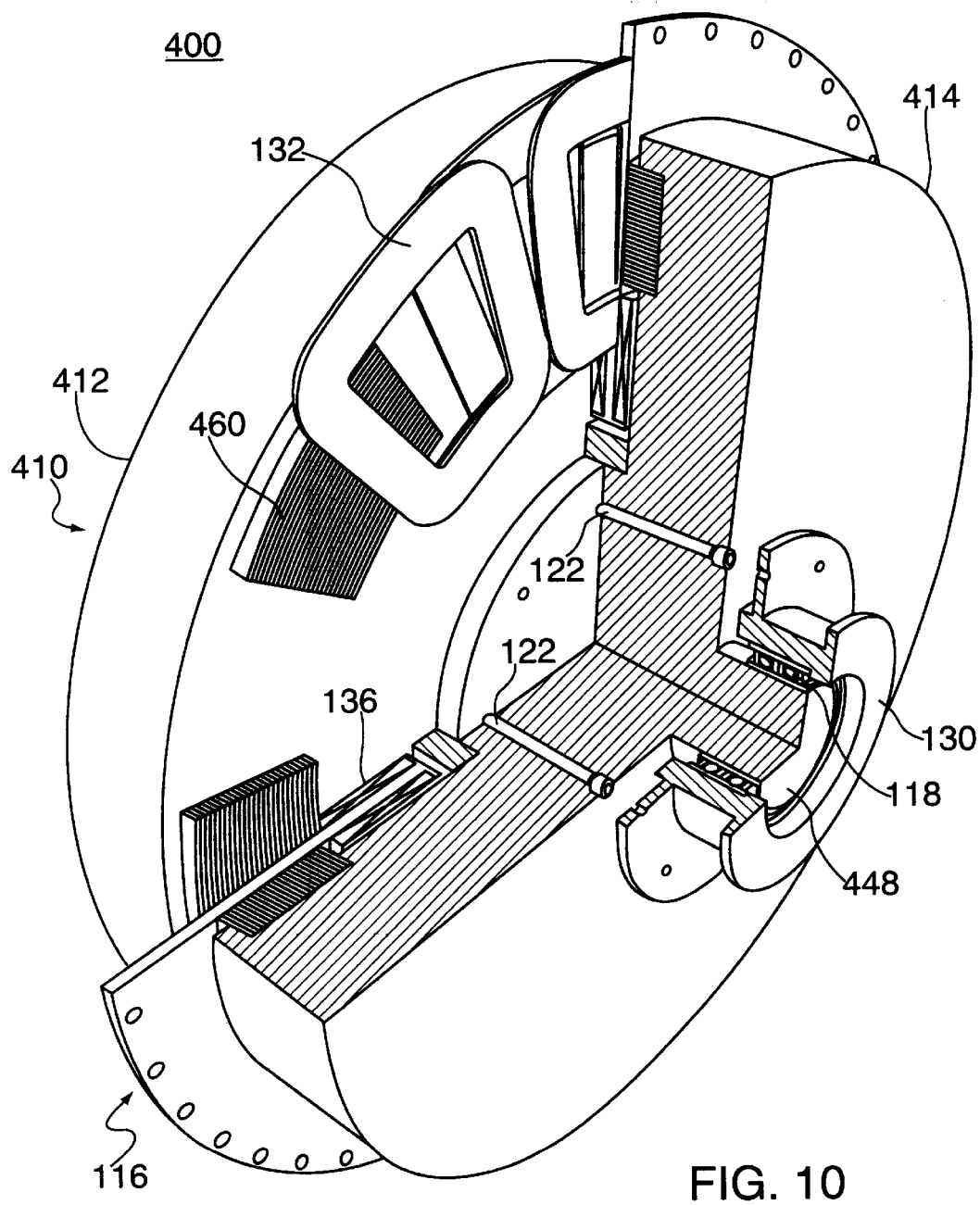
FIG. 10 is a three-dimensional, partial-cutaway, perspective view of a high-efficiency inductor-alternator having laminated rotor teeth constructed in accordance with the principles of the present invention.
Figure 11:
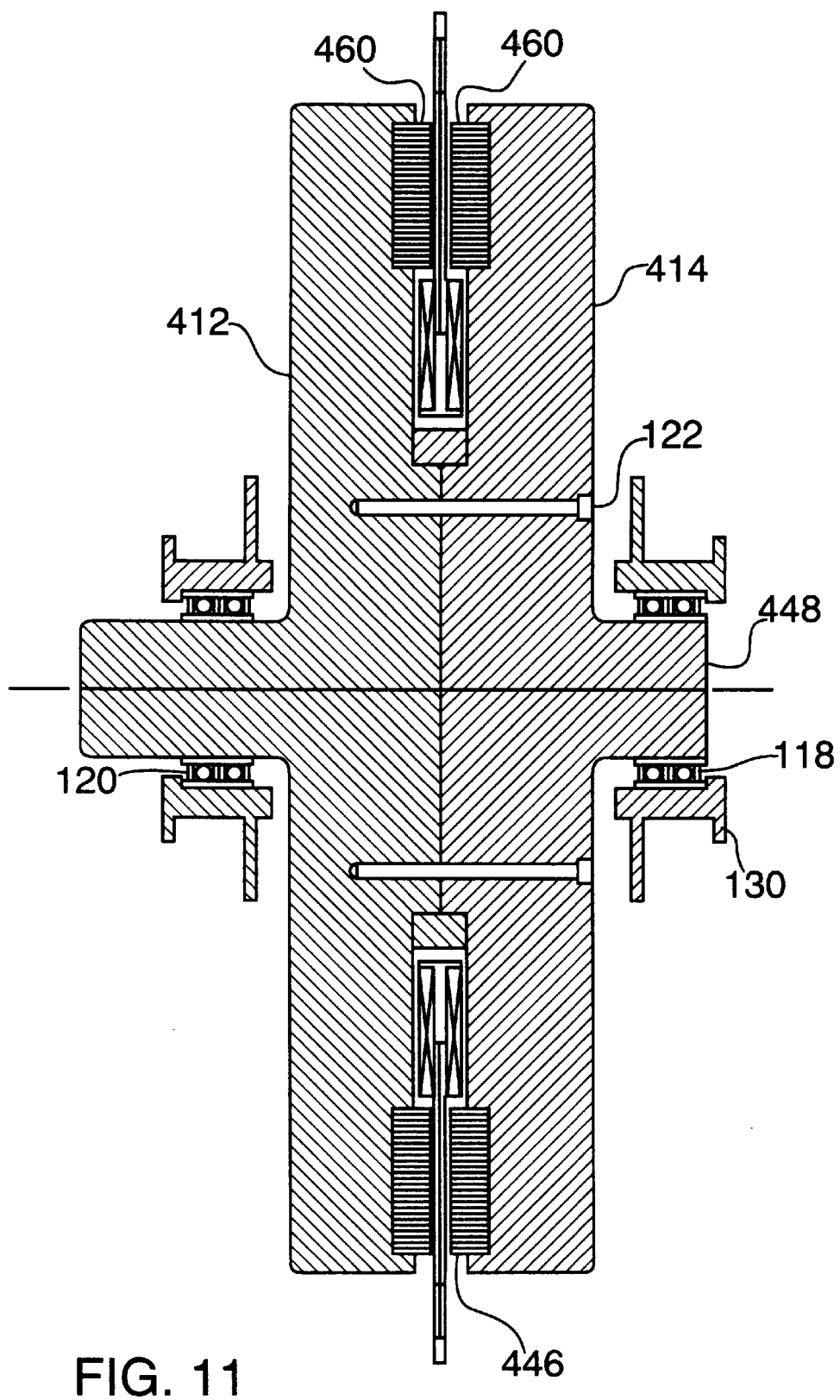
FIG. 11 is a cross-sectional view of the high-efficiency inductor-alternator of FIG. 10.

FIGS. 10 and 11 show another embodiment of a rotor for use in inductor-alternators in accordance with the principles of the present invention. FIG. 10 shows a three-dimensional, partial cutaway view (FIG. 11 shows a side sectional view) of inductor-alternator 400 that includes laminated teeth 460 mounted to rotor 410. Rotor 410 may be formed from rotor halves 412 and 414 with a single air gap 446 and a shaft 448. With the exception of laminated teeth 460, inductor-alternator 400 is substantially the same as inductor-alternator 100 of FIG. 1. One advantage of laminated teeth 460 is a reduction in eddy-current losses that arise from rapidly changing currents and fields of the armature coils. However, this advantage is partially offset by the reduced maximum tip speed (and accordingly reduced power density) necessitated because rotor 410 is a composite structure rather than formed from a single material.

Figure 12:
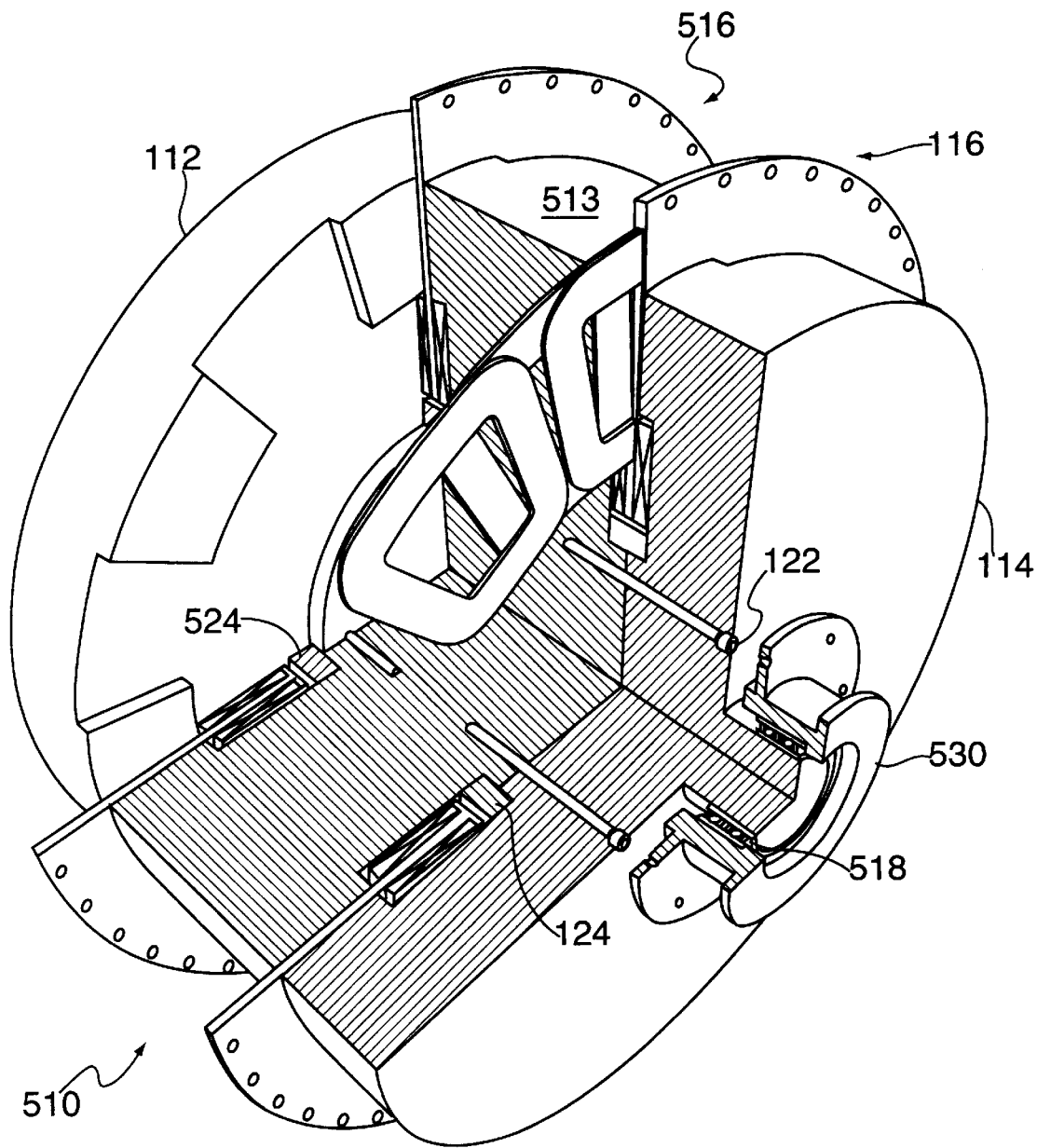
FIG. 12 is a three-dimensional, partial-cutaway, perspective view of a dual armature high-efficiency inductor-alternator constructed in accordance with the principles of the present invention.
Figure 13:
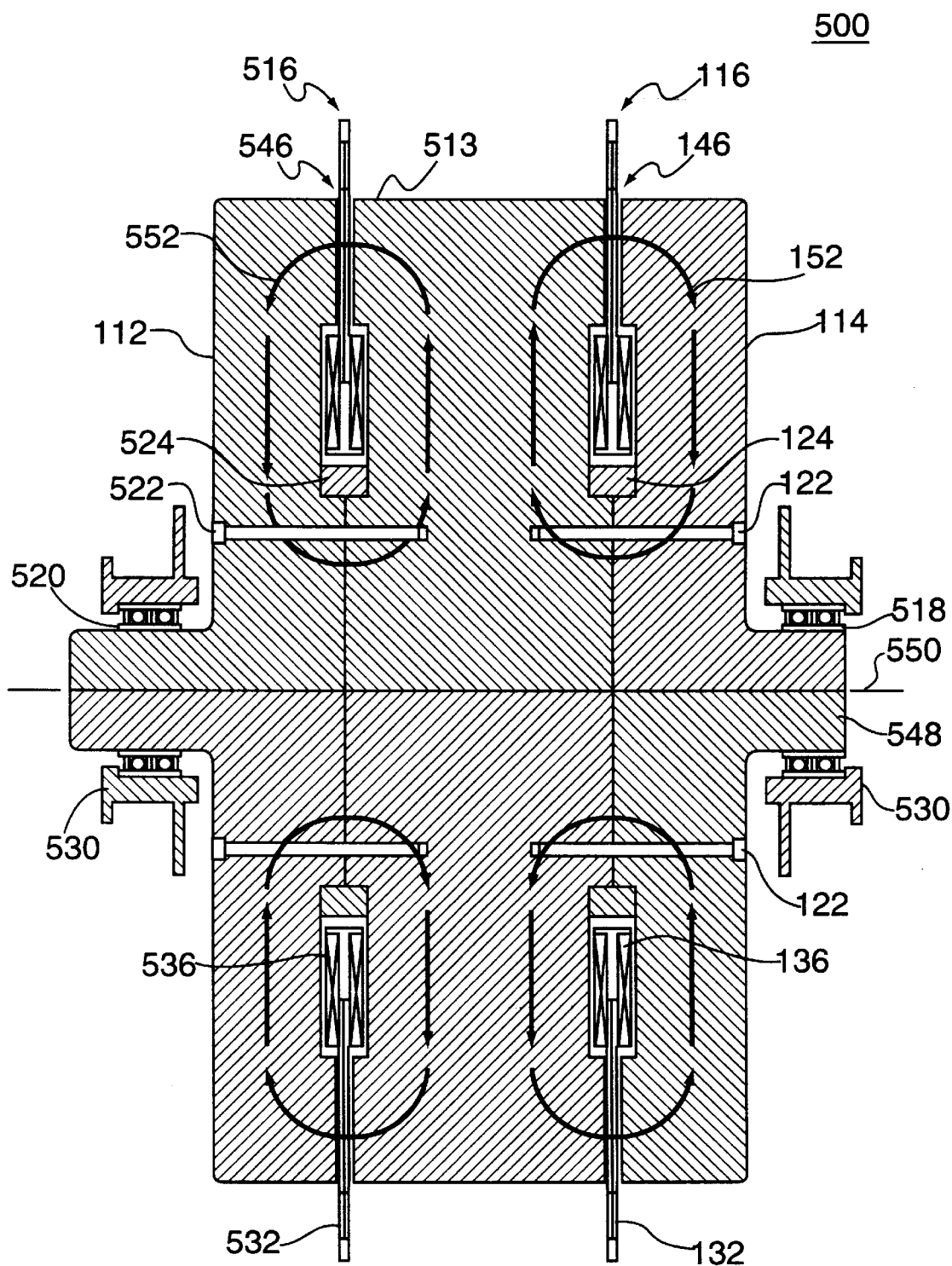
FIG. 13 is a cross-sectional view of the dual armature high-efficiency inductor-alternator of FIG. 12.
Figure 14:
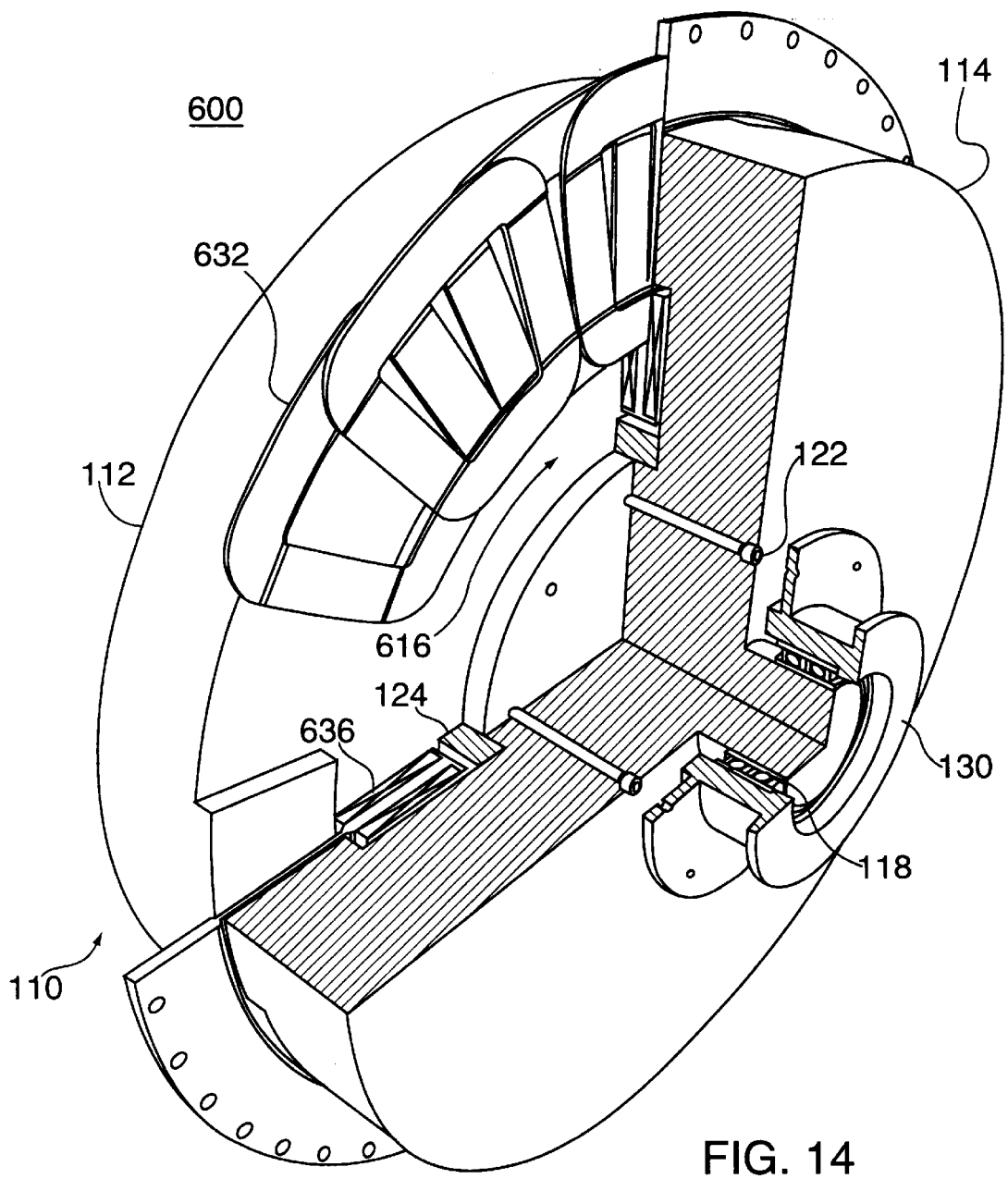
FIG. 14 is a three-dimensional, partial-cutaway, perspective view of a high-efficiency inductor-alternator having bent armature coils constructed in accordance with the principles of the present invention.

FIGS. 12 and 13 show another embodiment of the present invention in dual armature inductor-alternator 500. Inductor-alternator 500 provides several advantages over previously described embodiments for specific applications such as a high-performance motor-generator set. Under such requirements, one armature may be used as the motor while the other armature is used as a generator. This ensures total isolation between the motor input and the generator output. Persons skilled in the art will appreciate that, if isolation between motor input and generator output is desired in the previously described inductor-alternators (e.g., inductor-alternator 100), half of the armature coils could be used as a motor and the other half as a generator. Although isolation in a single armature device may not be as good as in a dual armature device, it should still be acceptable depending on the functional requirements.

FIG. 12 shows a three-dimensional, partial cutaway view of inductor-alternator 500 (FIG. 13 shows a sectional side view). Inductor-alternator 500 is similar to the previously described inductor-alternators, except that there are two armatures instead of one. The dual-armature configuration may be accomplished, however, by simply adding a wide center rotor section 513 between rotor halves 112 and 114 to form rotor 510 (section 513 is held in place radially by retainer ring 524 and axially by bolts 522), and adding a second stationary assembly 516 in second air gap 546 that is substantially similar to assembly 116. As previously described, the stationary assemblies may be preformed and assembled into inductor-alternators or used as replacement parts as required. Thus assembly 516 may include armature coils 532 and field coils 536.

Other components that may slightly vary from inductor-alternator 100 include bearing cartridges 530 and bearings 518 and 520 (to accommodate the additional weight of rotor segment 513). Although inductor-alternator 500 is shown with a "second" air gap, persons skilled in the art will understand that, in accordance with the present invention, the second air gap is merely the "single" air gap of a second armature—not the undesirable multiple air gap configuration of conventional devices.

FIGS. 14–17 show an embodiment of the present invention in which the air gap armature coils are "bent," in contrast to previously described "flat" armature coils 132. Bent armature coils permit a smaller magnetic air gap 646 that is advantageous over previously described air gaps 146 and 546. The bent armature coils require less axial space when laid on top of each other because the legs are essentially a single layer, rather than two layers. The reduced air gap also provides the advantages described above with respect to reducing the number of air gaps to a single air gap. Smaller magnetic air gaps mean that less power is required for the field coils, less heat is generated, and greater efficiency and power density are provided. For ease of description, all other components of inductor-alternator 600 are labeled using the previously described reference numbers (and thus, the previous description also applies), even though the configuration of the rotor in device 600 will vary slightly from rotor 110 because the armature air gap 646 is smaller than armature air gap 146 due to the use of bent armature coils 632. Accordingly, only the "new" stationary assembly 616 in inductor-alternator 600 is renumbered.

Figure 15:
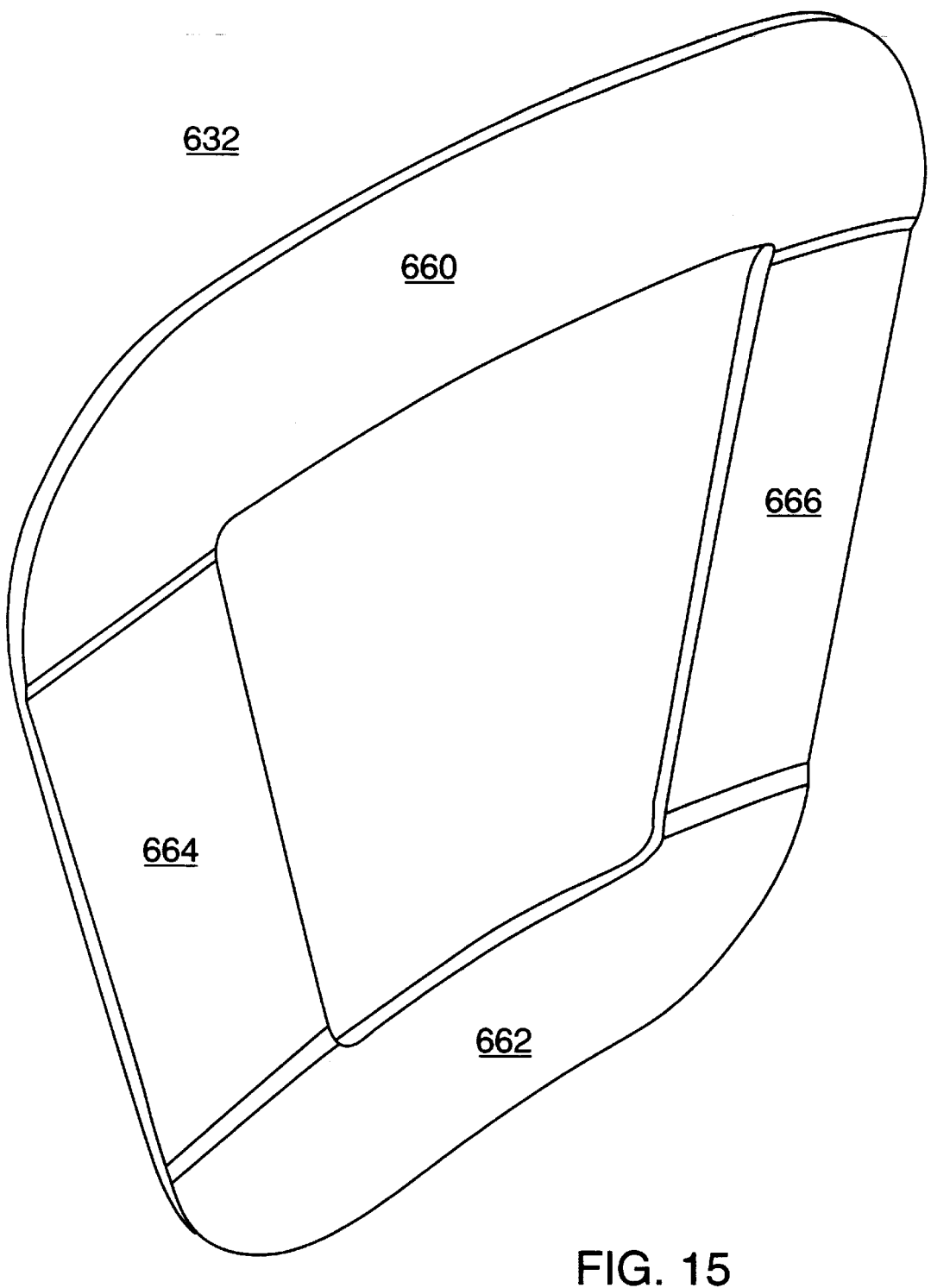
FIG. 15 is a three-dimensional perspective view of a bent armature coil of the high-efficiency inductor-alternator of FIG. 14.

Assembly 616 includes bent armature coils 632 and field coils 636 (which are substantially the same as field coils 136). The configuration of bent armature coils 632 is apparent from FIGS. 15 and 16. FIG. 15 shows a single bent armature coil 632. Each coil 632 includes outer end-turn element 660, inner end-turn element 662, left leg 664 and right leg 666. End-turn elements 660 and 662 are essentially in one plane, while legs 664 and 666 are in another, slightly offset, plane. The advantage of having the legs in one plane and the end-turn elements in another is that, when layered in a back-to-back configuration, the legs of both layers are essentially in the same plane. This is best shown in FIG. 17 by coils 670 and 672.

Coil 670 faces rotor half 112 and has legs that are bent toward rotor half 114. Coil 672 faces rotor half 114 and has legs that are bent toward rotor half 112 (only the end-turn elements of coil 672 are visible in FIG. 17). Because of this configuration, magnetic air gap 646 is smaller than magnetic air gap 146 (compare coils 132 of FIG. 3, in which the legs of both layers are clearly visible, to coils 670 and 672, in which essentially only a single layer of legs are visible). Although armature coils 632 are somewhat more expensive to manufacture than armature coils 132, the bends in the coils are slight enough that the coils may be wound flat and bent in a press, rather than having to be wound in a bent configuration.

Figure 18:
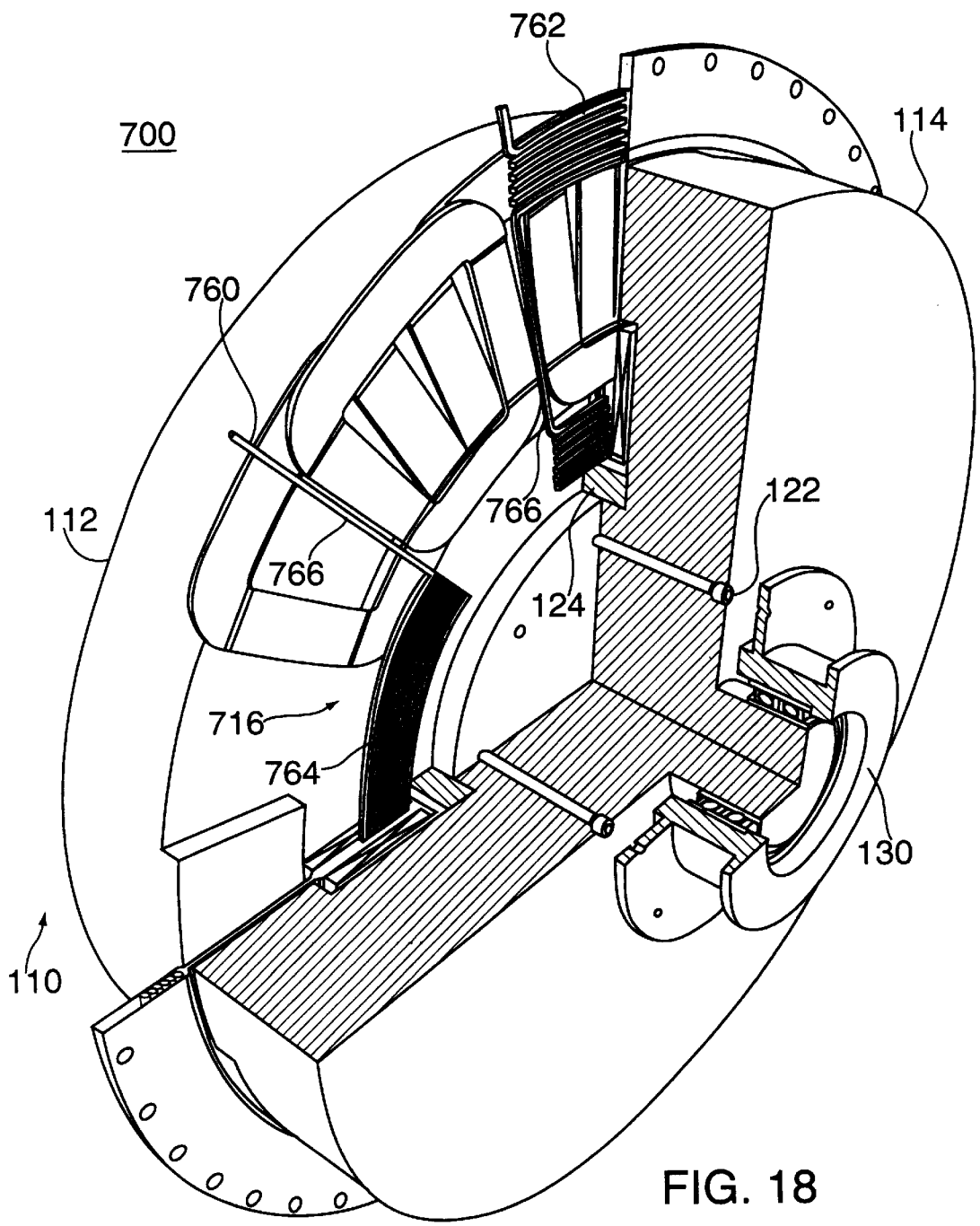
FIG. 18 is a three-dimensional, partial-cutaway, perspective view of a high-efficiency inductor-alternator having a liquid cooling system constructed in accordance with the principles of the present invention.

Some of the previously described advantages of the present invention relate to the thermal conduction paths for the field and armature coils. As described, the inductor-alternators of the present invention may be driven harder (i.e., higher average current densities in both the field and armature coils may be maintained over extended periods) than conventional devices because heat is dissipated in a more efficient manner. The field coils are in thermal contact with the armature coils, which are themselves in thermal contact with the housing and its "heat sink" cooling fins. If, however, it is desired to drive the inductor-alternators of the present invention beyond the convection cooling capacity of the housing, additional cooling may be provided as shown in FIGS. 18–20. FIG. 18 is a three-dimensional, partial cutaway view of inductor-alternator 700, and FIGS. 19 and 20 are sectional side views of the same.

Inductor-alternator 700 is substantially similar to inductor-alternators 100 and 600, and accordingly, previous reference numerals and descriptions similarly apply to FIGS. 18–20. The main difference between inductor-alternator 700 and previous inductor-alternators is the inclusion of liquid cooling coils 760 embedded within stationary assembly 716. Moreover, in order to achieve optimum cooling without impacting performance of the device, it is preferable that cooling coils 760 be formed of copper or other thermally conductive material in all areas that are not exposed to the active magnetic gap. For example, circumferential coil portions 762 and 764 are thermally conductive, while radial portions 766 are preferably nonconductive.

Figure 21:
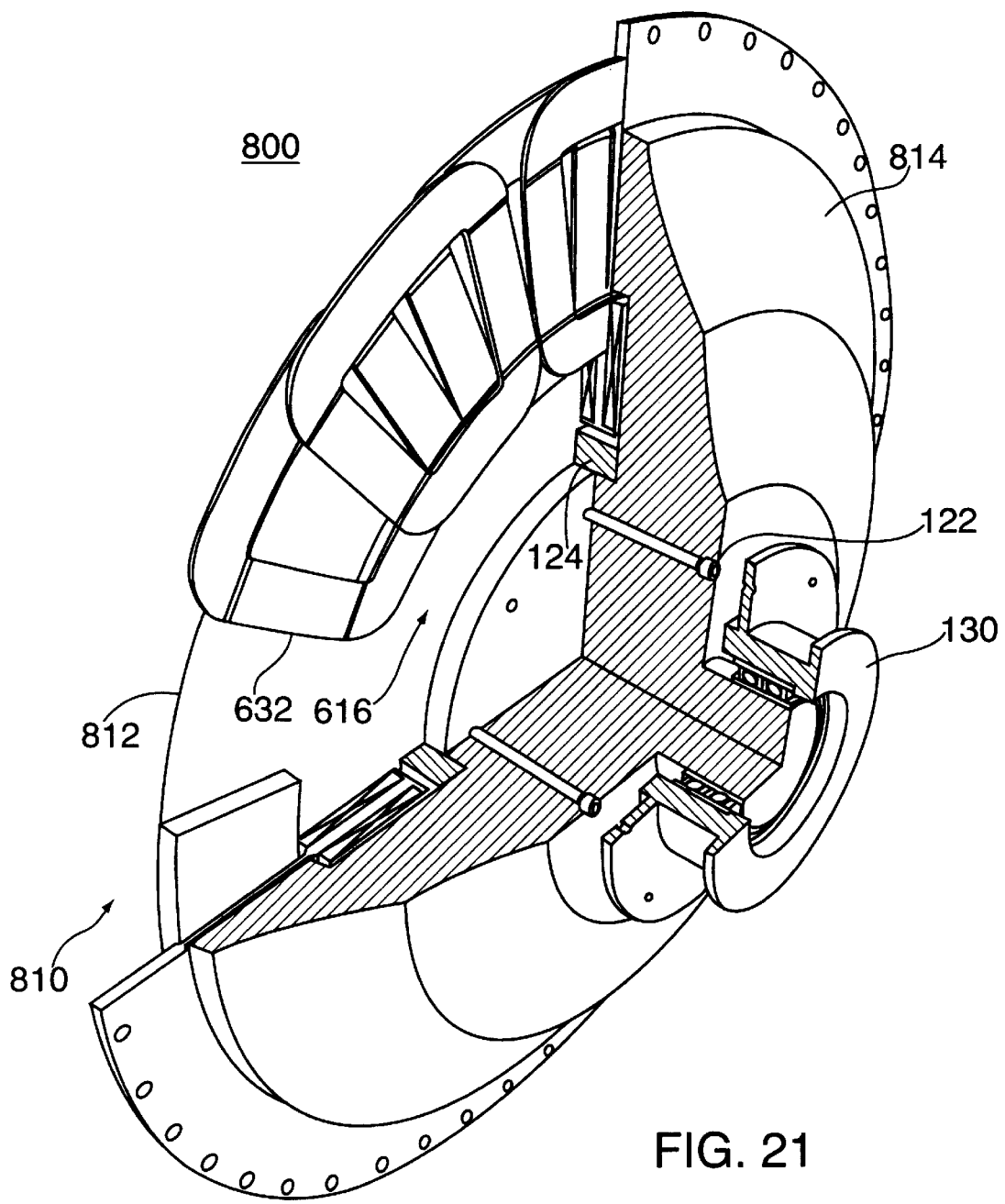
FIG. 21 is a three-dimensional, partial-cutaway, perspective view of a high-efficiency inductor-alternator optimized for power density constructed in accordance with the principles of the present invention.

Additional efficiency may be obtained by optimizing the rotor for power density, in accordance with the present invention, as shown by inductor-alternator 800 of FIGS. 21–23. FIG. 21 is a three-dimensional, partial cutaway perspective view, while FIGS. 22 and 23 are sectional side views. Inductor-alternator 800 may be more expensive to manufacture than previously described inductor-alternators. However, the changes in axial thickness of the rotor provide significantly improved power density for the overall device. Inductor-alternator 800 is similar to inductor-alternators 100 and 600 and, accordingly, some previously described components are similarly numbered.

The axial thickness of rotor 810 decreases with increasing radius so that inductor-alternator 800 has a substantially constant flux density. First distance 860 (R1) is about equal to the external radius of retainer ring 124, which defines the radial start of the cavity where field coils 636 are located. Second distance 862 (R2) is about equal to the external radius where the teeth of rotor 810 begin. Third distance 864 (R3) is about equal to the external radius of the rotor teeth. In general, the physical dimensions of inductor-alternator 800 preferably conform to the following equation:

$$\pi R1^2 \cong 2\pi R1 T1 \cong 2\pi R2 T2 \cong 5\pi(R3^2 - R^2)$$

where T1 (shown as distance 866) and T2 (shown as distance 868) are the axial thicknesses of each rotor half at distances R1 and R2, respectively. This means that the axial area of the inner shaft between the two rotor halves is approximately equal to the radial area of each rotor halve measured at distance R1, which also is approximately equal to the radial area of each rotor halve measured at distance R2, and which also is approximately equal to the axial area of the rotor teeth. Moreover, it should be noted that several of the inductor-alternators described herein generally conform to:

$$\pi R1^2 \cong 2\pi R1 T1 \cong \cdot 5\pi(R3^2 - R2^2)$$

so that the axial area of the inner shaft between the two rotor halves is approximately equal to the radial area of each rotor halve measured at distance R1, and also is approximately equal to the axial area of the rotor teeth.

Figure 24:
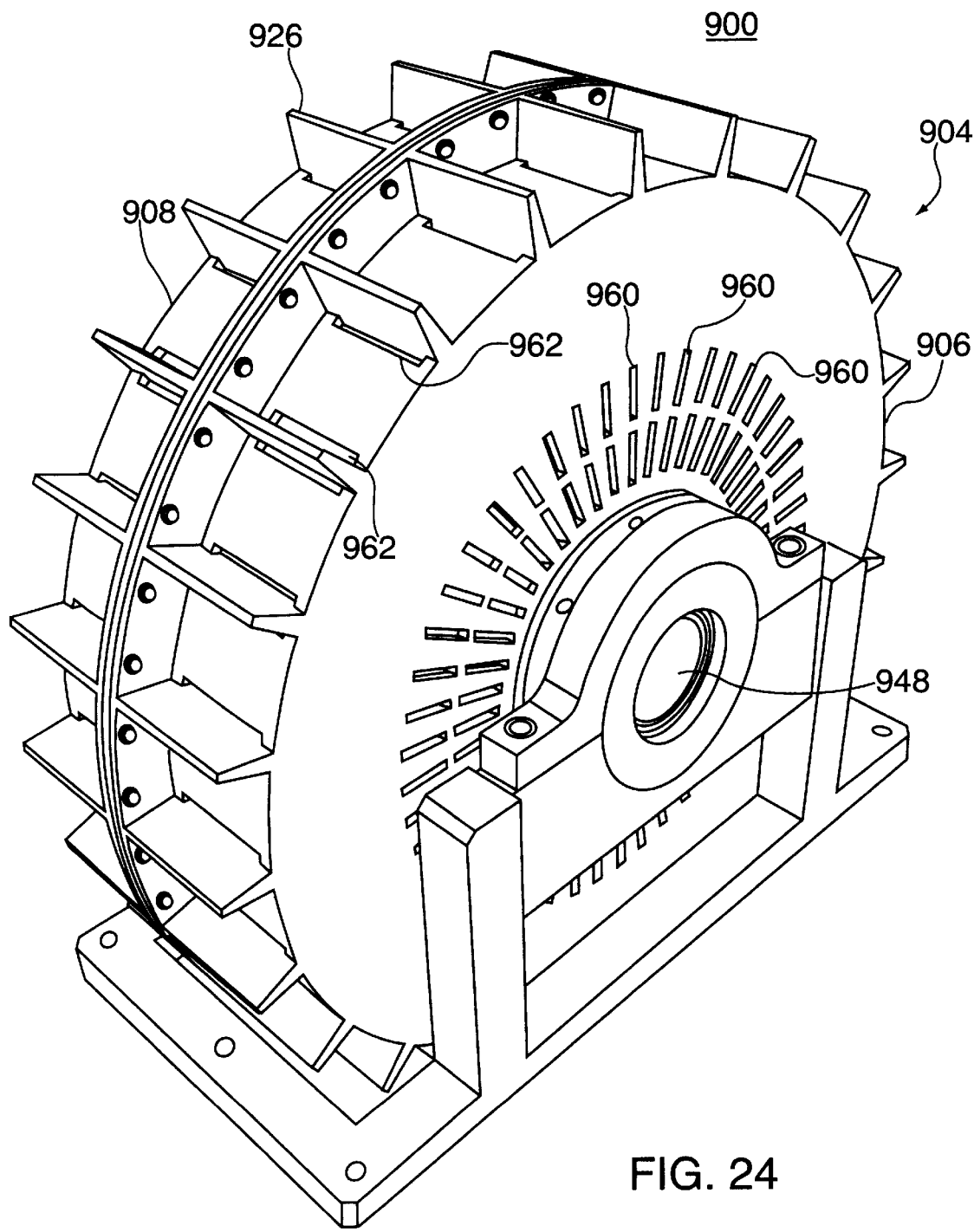
FIG. 24 is a three-dimensional, perspective view of an air-cooled high-efficiency inductor-alternator constructed in accordance with the principles of the present invention.

FIG. 24 shows a three-dimensional perspective view of air-cooled high-efficiency inductor-alternator 900. Air-cooled inductor-alternator 900 is substantially similar to all of the previously described inductor-alternators and the principles described herein may equally be applied to any of inductor-alternators 100–800. The basic difference between device 900 and the previously described inductor-alternators is housing 904 (and therefore, only the operation of housing 904 is described). Housing 904 may, for example, be used in place of housing 104 to provide more efficient air-cooling to inductor-alternator 100, or it may even be used as the housing for liquid-cooled inductor-alternator 700 to provide additional cooling.

Housing 904 is formed from shells 906 and 908 and includes cooling fins 926, radial cooling slots 960 and circumferential cooling slots 962. During inductor-alternator operation, cool air enters cooling slots 960 near shaft 948. The cool air is naturally pumped into device 900 and accelerates through device 900 toward the outer diameter of the rotor (not shown in FIG. 24). The cool air (which now is somewhat warmer than when it entered slots 960 due to the direct conduction path over the rotor) exits housing 904 through cooling slots 962 and passes cooling fins 926. This provides additional cooling to cooling fins 926 that indirectly cools the armature and field coils (not shown in FIG. 24). As described above, air-cooled housing 904 may be used as the housing for any of the previously described inductor-alternators, including inductor-alternator 500. In that case, housing 904 preferably includes an additional central shell (not shown) attached between shells 906 and 908).

It will be understood that the foregoing is only illustrative of the principles of the invention, and that various modifications can be made by those skilled in the art without departing from the scope and spirit of the invention. For example, although the embodiments shown and described herein include an air-gap magnetic flux that is parallel to the axis of rotation, persons skilled in the art will appreciate that inductor-alternators made in accordance with the principles of the present invention also may include an air-gap magnetic flux that is non-parallel to the axis of rotation. Moreover, although each embodiment shows both rotor halves having teeth, persons skilled in the art will appreciate, as described above, that inductor-alternators may be fabricated in accordance with the principles described herein having only one toothed rotor halve, with the other rotor halve having a substantially smooth surface.

What is claimed is:

1. An apparatus for providing emergency power in the event of a disruption in power from a primary power source, said apparatus comprising:
    a rotatable mass that stores mechanical energy, said rotatable mass having only a single magnetic air gap formed between first and second halves of said rotatable mass, said first half having protrusions extending therefrom into said air gap;
    a plurality of stationary armature coils mounted within said air gap;
    a stationary field coil that, in response to a drive signal, causes said apparatus to convert mechanical energy stored by said rotatable mass to electrical power at a high frequency; and
    a converter circuit that converts said high frequency electrical power to low frequency electrical power for output to a load.

2. The apparatus of claim 1, wherein said low frequency is from about 0 Hz to about 100 Hz.

3. The apparatus of claim 1, wherein said high frequency is from about 300 Hz to about 2000 Hz.

4. The apparatus of claim 1 further comprising:
    a monitoring system that monitors rotor speed and automatically varies said drive signal to said field coil when said rotor falls below a predetermined speed.

5. The apparatus of claim 1 further comprising:
    a fuel powered engine coupled to said rotatable mass to provide said high frequency electrical power until said primary power is restored.

6. The apparatus of claim 1 further comprising:
    a monitoring system that monitors primary power;
    a clutch coupled to said rotatable mass;
    an engine starting system coupled to said monitoring system; and
    a fuel powered engine coupled to said clutch and to said engine starting system, said monitoring system providing an engine start signal to said engine starting system after primary power is disrupted and a predetermined period of time has passed, said engine accelerating to a rotational speed, said clutch engaging said rotatable mass when said engine reaches said rotatable speed so that said engine drives said rotatable mass to provide said high frequency electrical power until said primary power is restored.

7. The apparatus of claim 6, wherein said engine speed varies depending on load requirements to minimize fuel consumption for a given load.

8. An apparatus for providing power to a load, said apparatus comprising:
    a ferromagnetic rotor, said rotor having only a single magnetic air gap formed between first and second halves of said rotor, said first half having protrusions extending therefrom into said air gap;
    a fuel powered engine coupled to said rotor so that said engine rotates said rotor;
    a plurality of stationary armature coils mounted within said air gap;
    a stationary field coil that, in response to a drive signal, produces a magnetic flux that causes mechanical power produced by said engine to be converted to electrical power at a high frequency; and
    a converter circuit that converts said high frequency electrical power to low frequency electrical power for output to said load.

9. The apparatus of claim 8 further comprising:
    a monitoring system that monitors said load and automatically varies rotational speed of said rotor in response to said load.

10. The apparatus of claim 8, wherein said high frequency power is between about 300 and about 2000 Hz.

11. The apparatus of claim 8, wherein said low frequency power is between 0 and about 100 Hz.

12. The apparatus of claim 8, wherein said converter circuit is a cycloconverter.

13. The apparatus of claim 12, wherein said cycloconverter switches said high frequency electrical power directly into said low frequency electrical power when the voltage of said high frequency electrical power is substantially zero.

14. The apparatus of claim 12, wherein said cycloconverter switches said high frequency electrical power directly into said low frequency electrical power when the current of said high frequency electrical power is substantially zero.

15. The apparatus of claim 8, wherein said engine speed varies depending on load requirements to minimize fuel consumption for a given load.

* * * * *

UNITED STATES PATENT AND TRADEMARK OFFICE
CERTIFICATE OF CORRECTION

PATENT NO. : 6,323,573 B1
DATED : November 27, 2001
INVENTOR(S) : Joseph F. Pinkerton It is certified that error appears in the above-identified patent and that said Letters Patent is hereby corrected as shown below:

<u>Column 4,</u>
Line 28, change "partialcutaway," to -- partial-cutaway, --;

<u>Column 12,</u>
Line 47, change "$\pi R1^2 \cong 2\pi R1T1 \cong 2\pi R2T2 \cong 5\pi(R3^2-R^2)$" to
-- $\pi R1^2 \cong 2\pi R1T1 \cong 2\pi R2T2 \cong 0.5\pi(R3^2-R^2)$ --.

Signed and Sealed this

Fourth Day of June, 2002

Attest:

Attesting Officer

JAMES E. ROGAN
Director of the United States Patent and Trademark Office